Oct. 18, 1966  H. R. LYNCH  3,279,664
APPARATUS FOR CUTTING GLASS
Filed Aug. 11, 1964  13 Sheets-Sheet 1
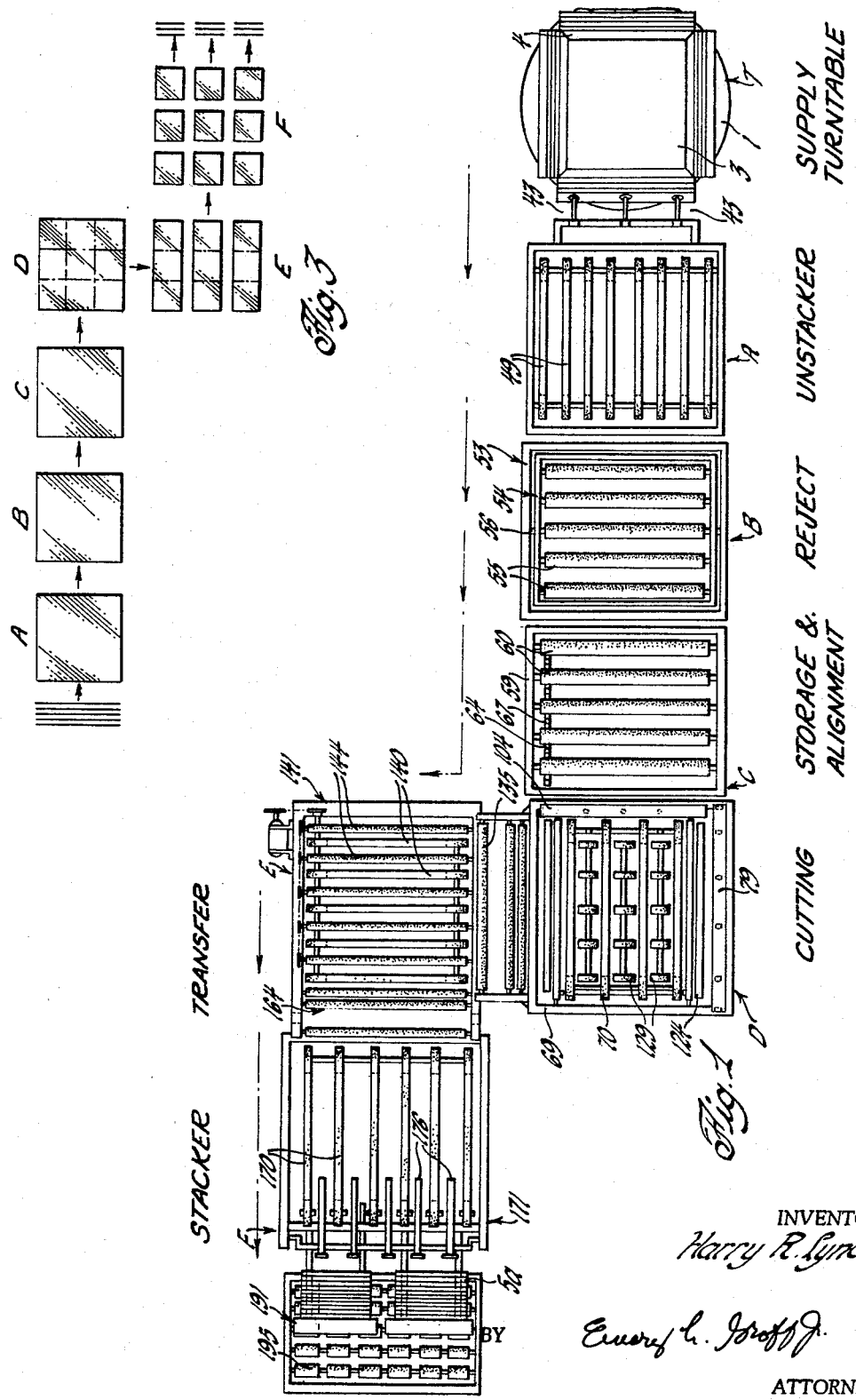
INVENTOR
Harry R. Lynch
BY
Emory L. Groff Jr.
ATTORNEY Oct. 18, 1966 H. R. LYNCH 3,279,664
APPARATUS FOR CUTTING GLASS
Filed Aug. 11, 1964 13 Sheets-Sheet 2
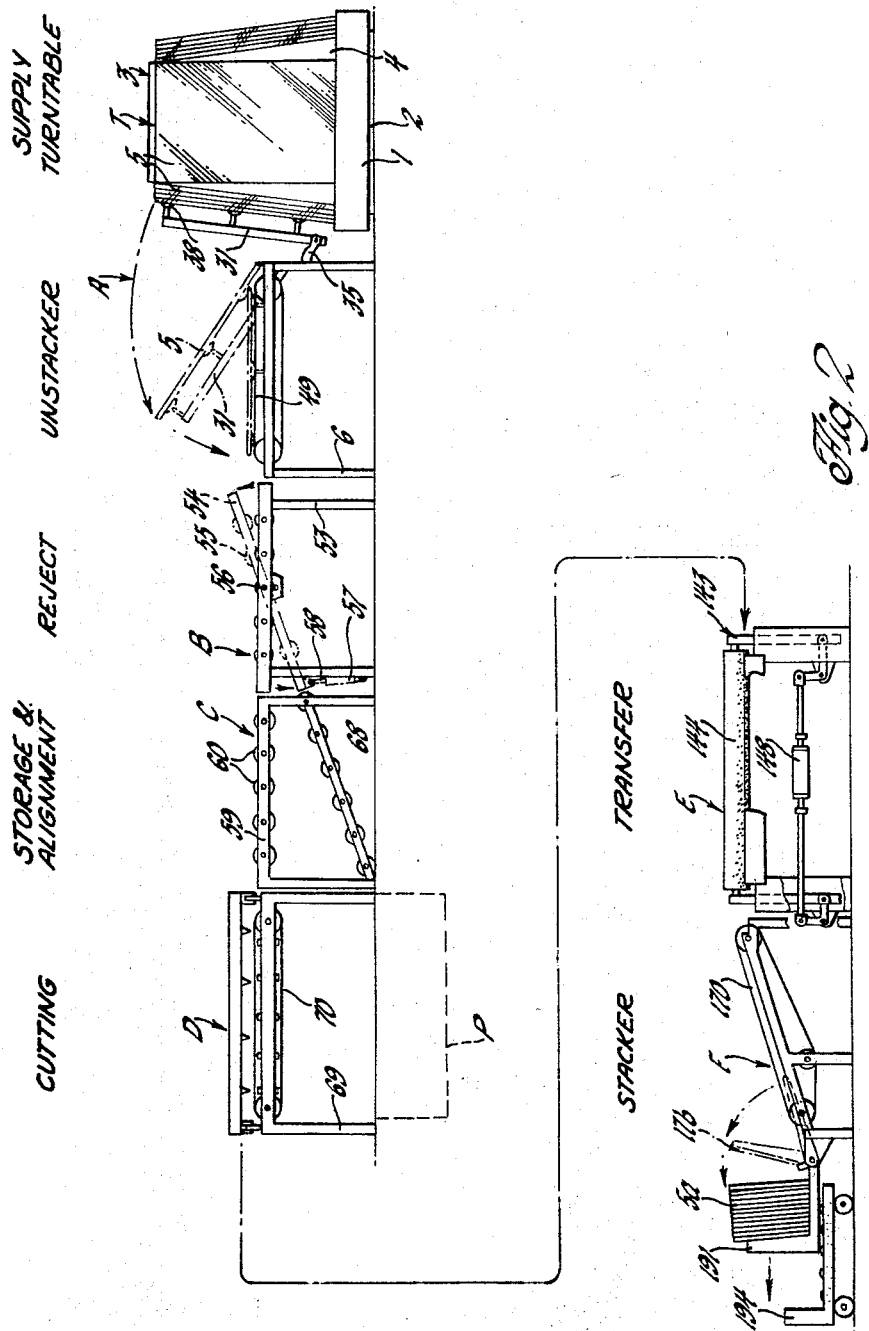
INVENTOR
Harry R. Lynch
BY
ATTORNEY

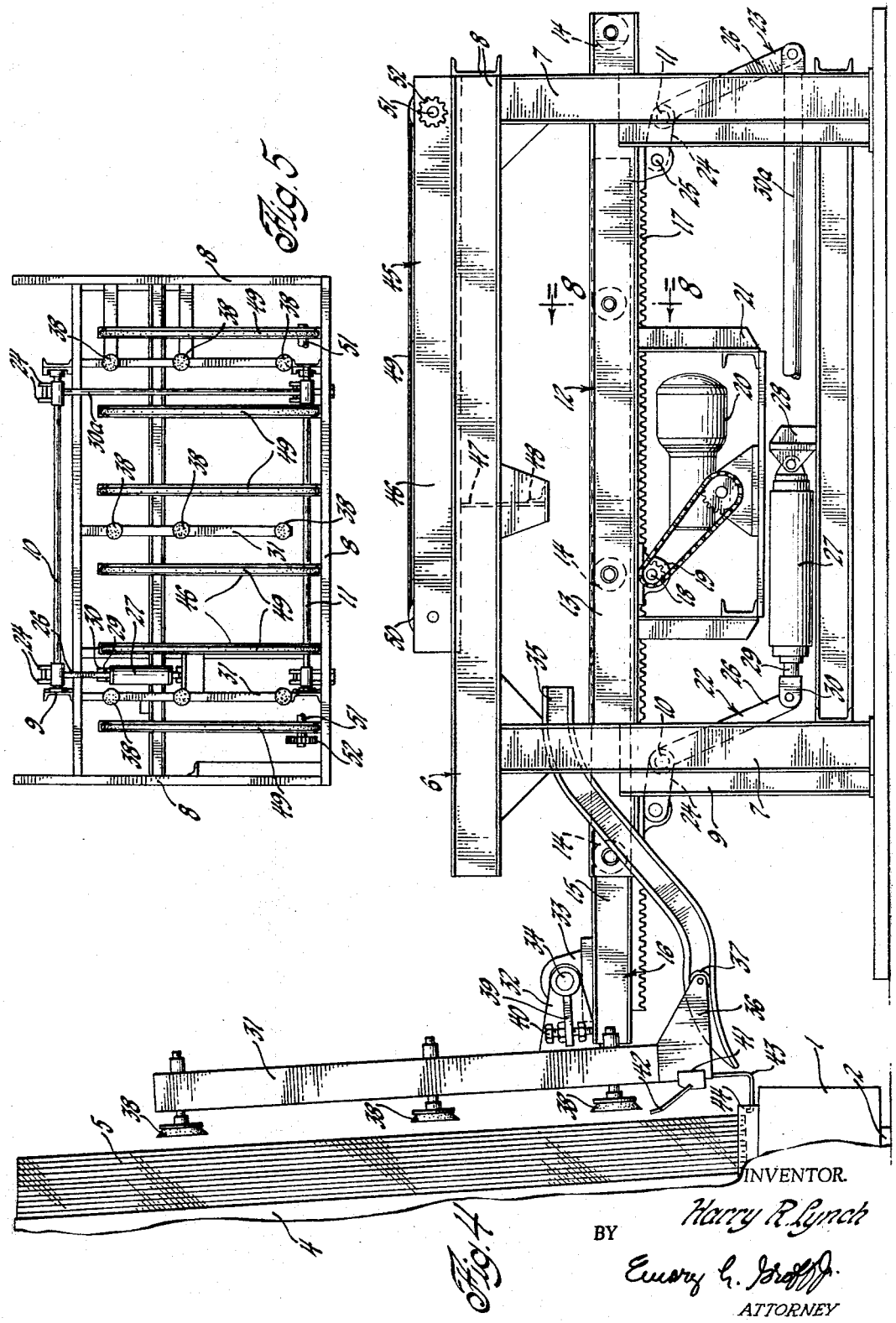

INVENTOR.
Harry R. Lynch
BY
Emory L. Groff Jr.
ATTORNEY

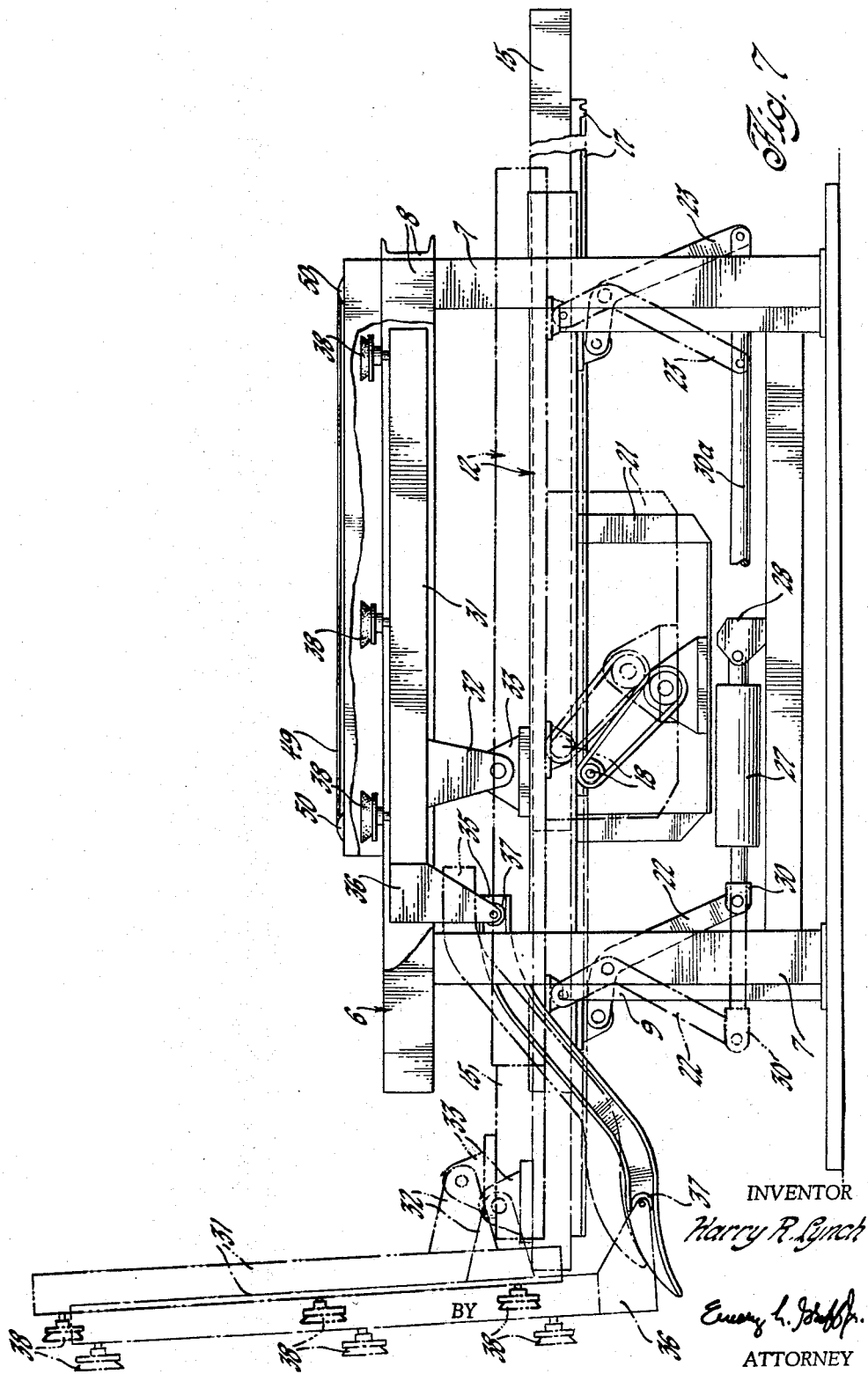

Oct. 18, 1966

H. R. LYNCH 3,279,664

APPARATUS FOR CUTTING GLASS

Filed Aug. 11, 1964

INVENTOR.
Harry R. Lynch
BY
Emery G. Groff
ATTORNEY

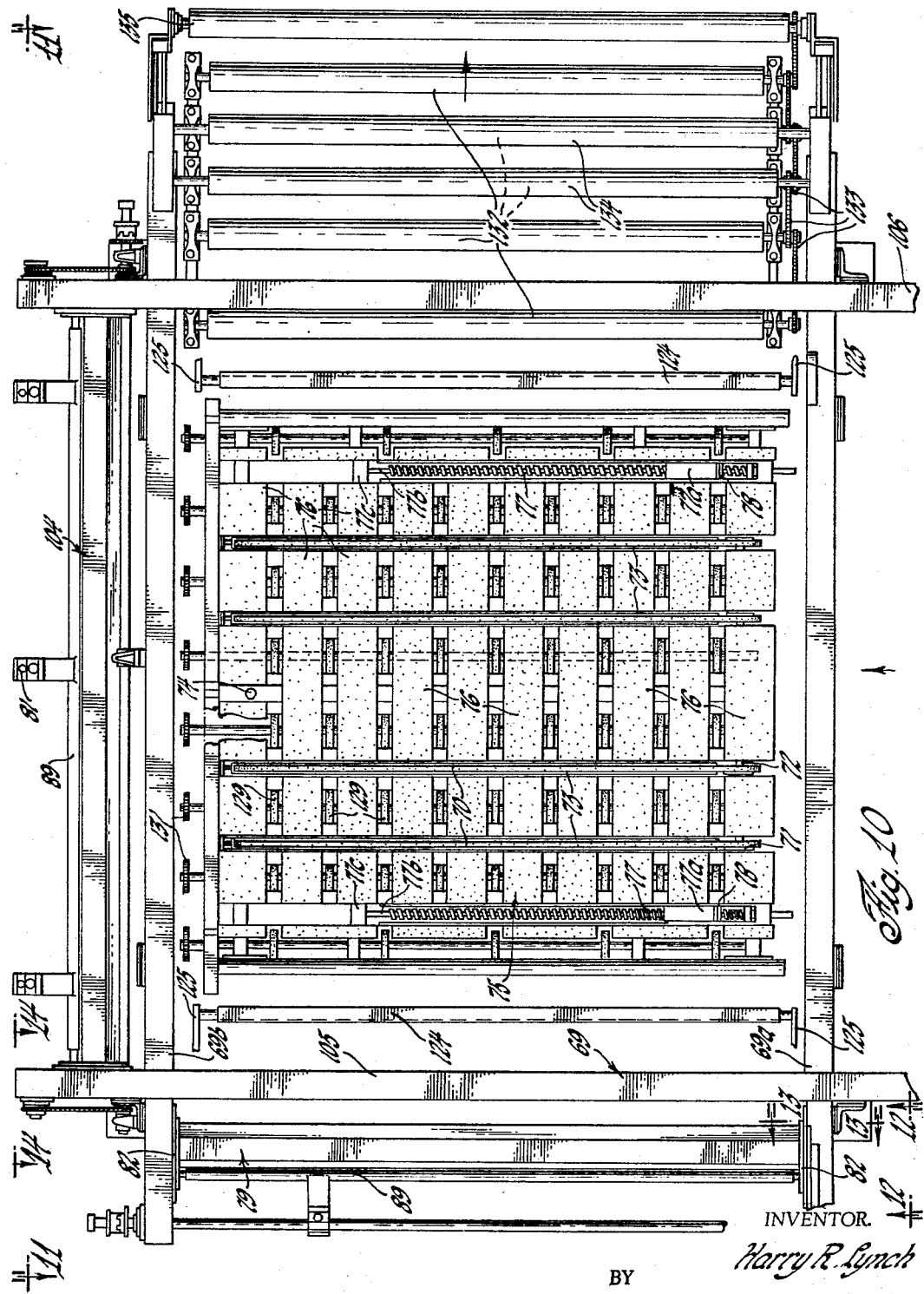

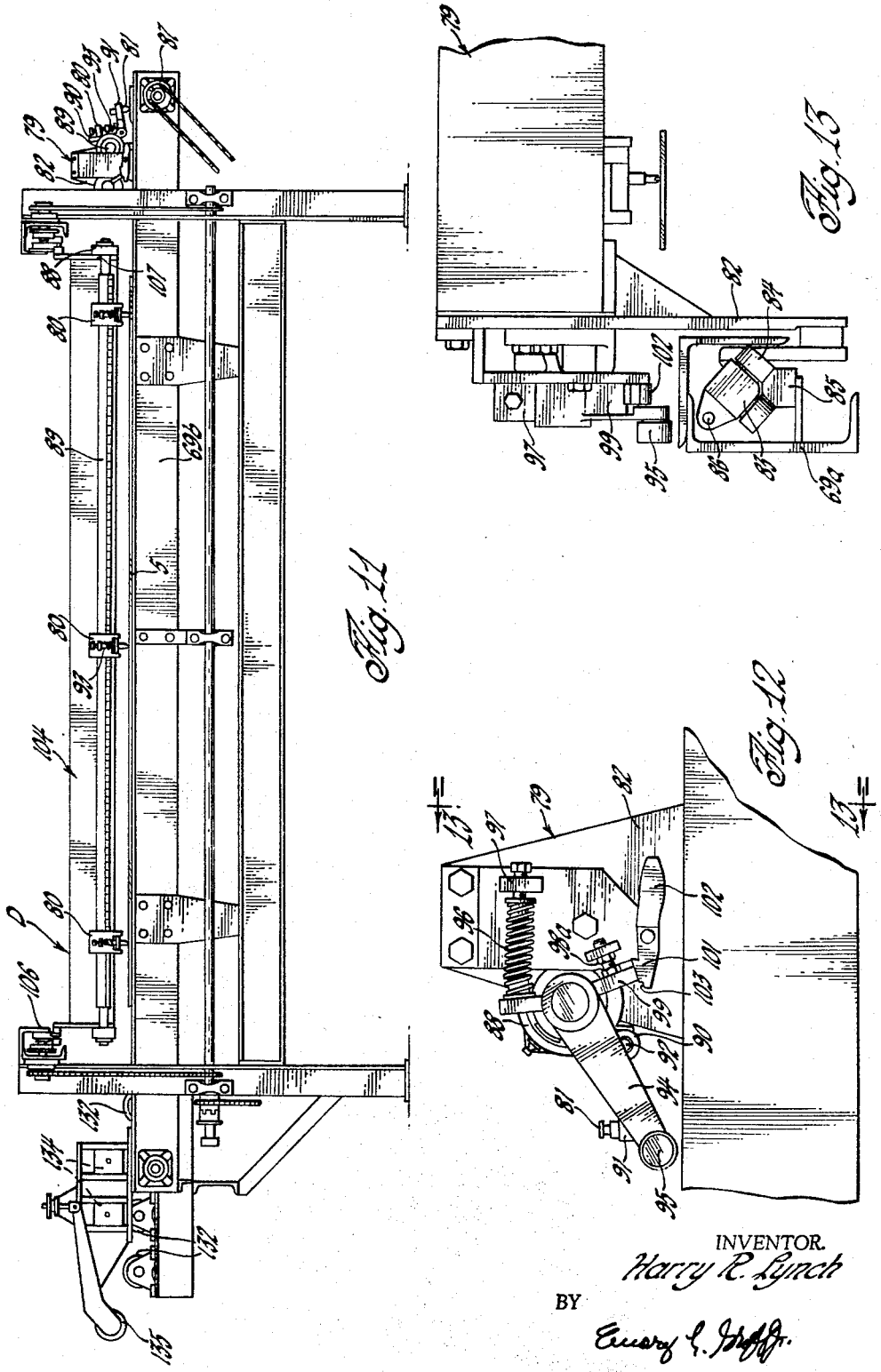

INVENTOR
Harry R. Lynch
BY
ATTORNEY

INVENTOR
Harry R. Lynch

BY
ATTORNEY

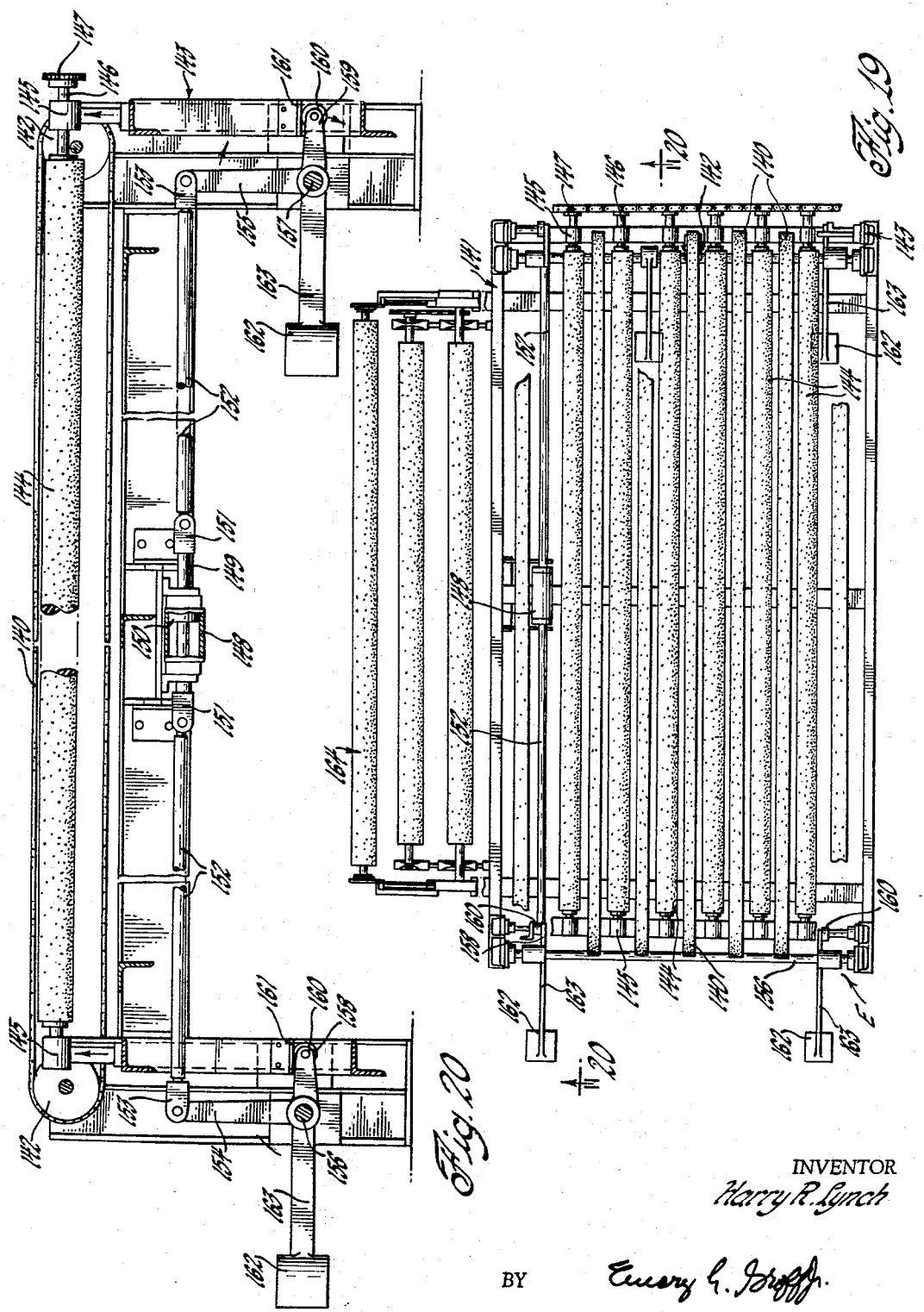

Oct. 18, 1966  H. R. LYNCH  3,279,664
APPARATUS FOR CUTTING GLASS
Filed Aug. 11, 1964  13 Sheets-Sheet 12

INVENTOR
Harry R. Lynch
BY Emory L. Groff
ATTORNEY

Oct. 18, 1966 H. R. LYNCH 3,279,664
APPARATUS FOR CUTTING GLASS
Filed Aug. 11, 1964 13 Sheets-Sheet 13
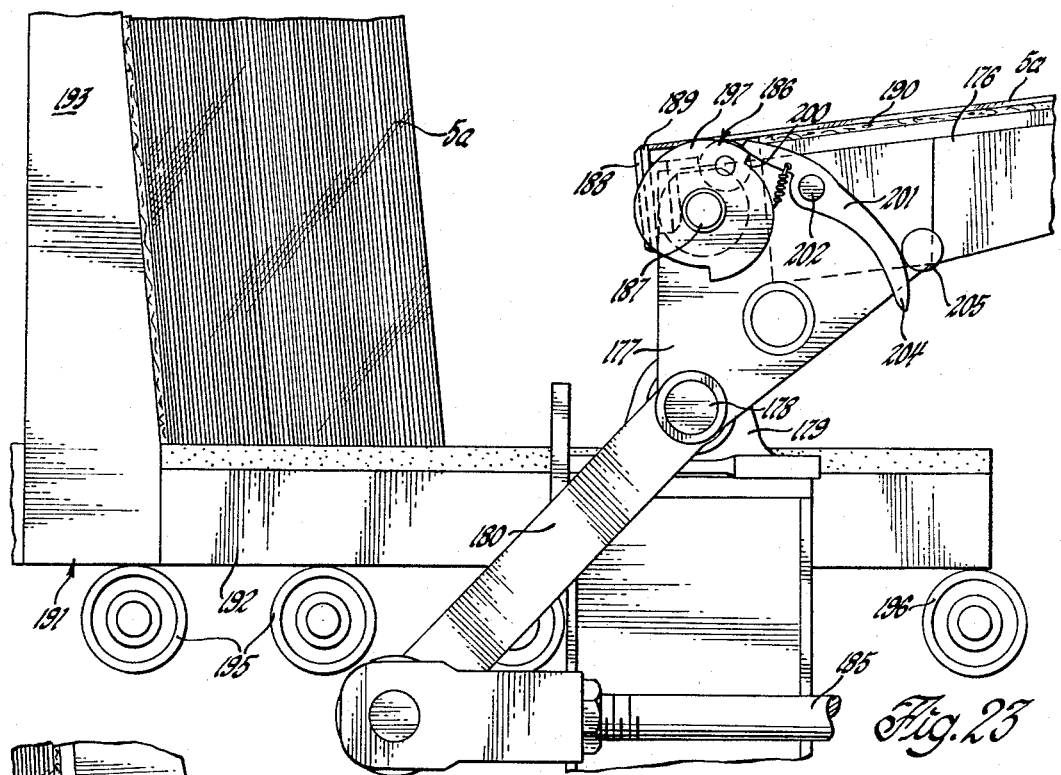
Fig. 23
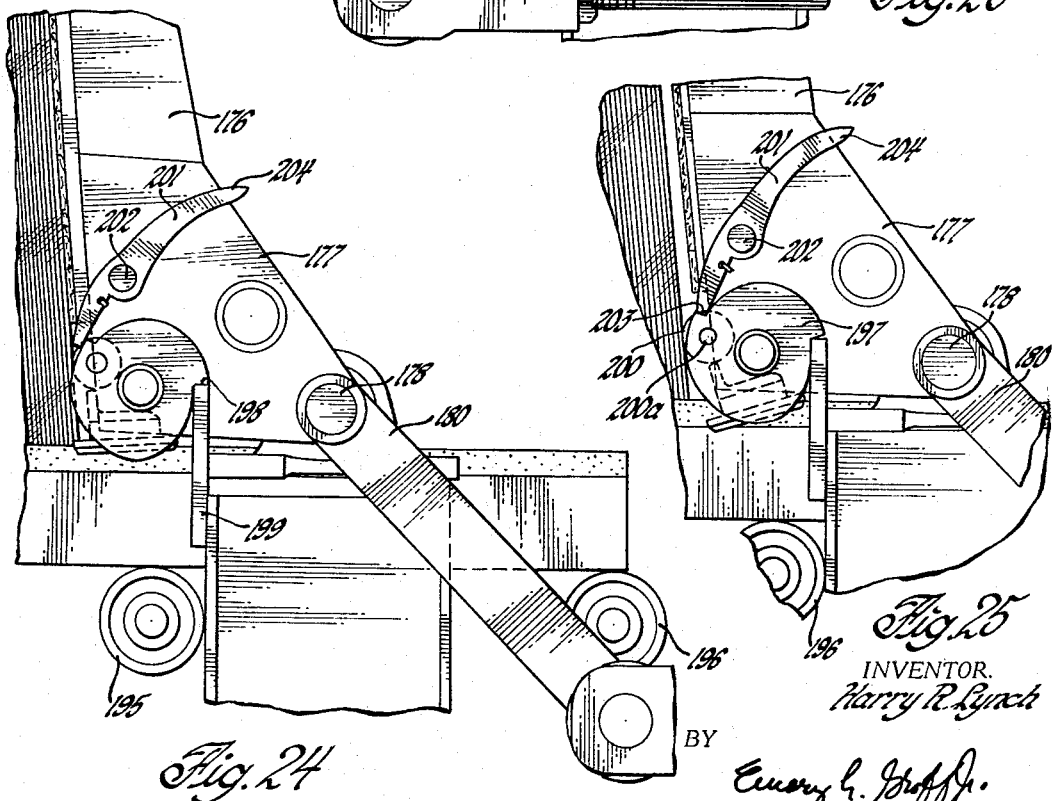
Fig. 24
Fig. 25
INVENTOR.
Harry R. Lynch
BY
Emery G. Groff Jr.
ATTORNEY

United States Patent Office 3,279,664
Patented Oct. 18, 1966

3,279,664
APPARATUS FOR CUTTING GLASS
Harry R. Lynch, Harrison, W. Va., assignor to Rolland Glass Company, Clarksburg, W. Va., a corporation of West Virginia
Filed Aug. 11, 1964, Ser. No. 388,769
22 Claims. (Cl. 225—96.5)

This invention relates generally to an apparatus for cutting sheet glass, and more particularly to a cutting machine for automatically handling glass from the time it is brought from the warehouse in large sheet form until the time it is cut into the desired panes or lights and subsequently stacked.

Several types of automatic glass-cutting machines have been known in the past. However, these devices have had certain inherent disadvantages which until now have not been satisfactorily resolved. Many of the known machines, for instance, require that the apparatus be turned off each time a new supply of large sheets of glass is brought from the warehouse to be fed to the machine. The present apparatus includes a novel feeding station whereby a continuous supply of large sheet glass is always available to the unstacker or initial station of the apparatus. Similarly, a bottleneck in the older machines has occurred at the final or stacker station, due to the fact that inadequate means has been provided for receiving and removing the glass after it has been cut into its final form. The instant apparatus also overcomes this disadvantage by providing for unique stacking means which may be unloaded without discontinuing the operation of the machine.

It will be understood that the above advantages are most desirable in the operation of a device of this character since it is necessary, in order to profitably utilize such a device, that the operation be as continuous as possible in order to provide for a maximum output of cut glass panes or lights. This new machine provides an output capacity far greater than any of the present known devices.

Besides providing for a novel combination of stations, this machine includes new operating mechanisms in several of the individual stations. One of these mechanisms relates to a unique system for providing for both longitudinal and lateral alignment of the large sheets of glass prior to the cutting operation upon these sheets. This is a very important requirement in glass-cutting apparatus since even a minute misalignment of, say, a 4′ x 8′ sheet of glass would produce a plurality of cut panes or lights which would subsequently have to be rejected. The present machine, by means of a new control system, including sonar-actuated means, provides for a minimum number of rejects and thereby increases the profitable yield of the apparatus.

Heretofore, similar devices have incorporated a very complicated, expensive and massive apparatus for the purpose of unstacking or picking up and arranging the large sheets of glass being fed into the machine. In view of the nature of these known devices, the output of square feet of cut glass per hour has necessarily been limited due to the relatively slow rate of operation of this initial portion of the machine, it being obvious that no one station on the machine can possibly operate any faster than the slowest station of the machine.

Accordingly, one of the primary objects of this invention is to provide an apparatus for cutting glass, including a plurality of stations for automatically and sequentially performing individual operations upon sheets of glass.

Another object of this invention is to provide an automatic glass-cutting apparatus, including turn-table means for providing a continuous, uninterrupted supply of large sheets of glass to the unstacker or initial station of the machine.

A further object of the invention is to provide a glass-cutting apparatus having positive, instantly responsive means to provide accurate longitudinal as well as lateral alignment of the large sheets of glass prior to the cutting thereof.

Still another object of this invention is to provide a glass-cutting apparatus having a manually controlled reject station located between an unstacker station and alignment station to permit the operator to discard a visually noticeable imperfect sheet of glass prior to its being cut, without necessitating the stoppage of the remaining stations of the machine.

Another object of the invention is to provide a glass-cutting apparatus having a stacker station including more rapid and accurate means for removal of the cut lights without stoppage of the machine.

With these and other objects in view which will more readily appear as the nature of the invention is better understood, the invention consists in the novel construction, combination, and arrangement of parts, hereinafter more fully described, illustrated, and claimed.

A preferred and practical embodiment of the invention is shown in the accompanying drawings, in which:

FIGURE 1 is a top plan view diagrammatically illustrating the invention.

FIGURE 2 is a side elevation diagrammatically illustrating the various stations of the invention as shown in FIGURE 1.

FIGURE 3 is a schematic plan view of a sheet of glass at it appears at each one of the stations of the apparatus.

FIGURE 4 is a side elevation of the unstacker station with the pickup arms about to engage a sheet of uncut glass.

FIGURE 5 is a top plan view of the unstacker station with portions omitted to illustrate the actuating means for producing compound movement of the pickup arm frame assembly shown in the retracted position.

FIGURE 7 is a side elevational view of the unstacker station with portions omitted and broken away to illustrate alternate positions of the movable frames included in this station.

FIGURE 10 is a top plan view of the cutting station.

FIGURE 11 is a rear elevational view of the cutting station taken along line 11—11 of FIGURE 10.

FIGURE 12 is a partial end elevation of the short cutting bridge, taken along the line 12—12 of FIGURE 10.

FIGURE 13 is a partial elevational view of the inside of the short bridge taken along the line 13—13 of FIGURE 12.

FIGURE 19 is a top plan view, partly broken away of the transfer station.

FIGURE 20 is a vertical sectional view slightly enlarged, taken along the line 20—20 of FIGURE 19 and illustrating the actuating means for raising and lowering the roller conveyors on the transfer station.

FIGURE 23 is a partial side elevation of the stacker arm actuating mechanism.

FIGURE 24 is a partial side elevation of the stacker arms about to deposit a sheet of glass upon the stacking frames.

FIGURE 25 is a partial side elevation similar to FIGURE 24 and showing the pusher roll after it has been actuated to advance the stacked lights on the stacking frame.

Similar reference characters designate corresponding parts throughout the several figures of the drawings.

General description of apparatus

Figure 6:
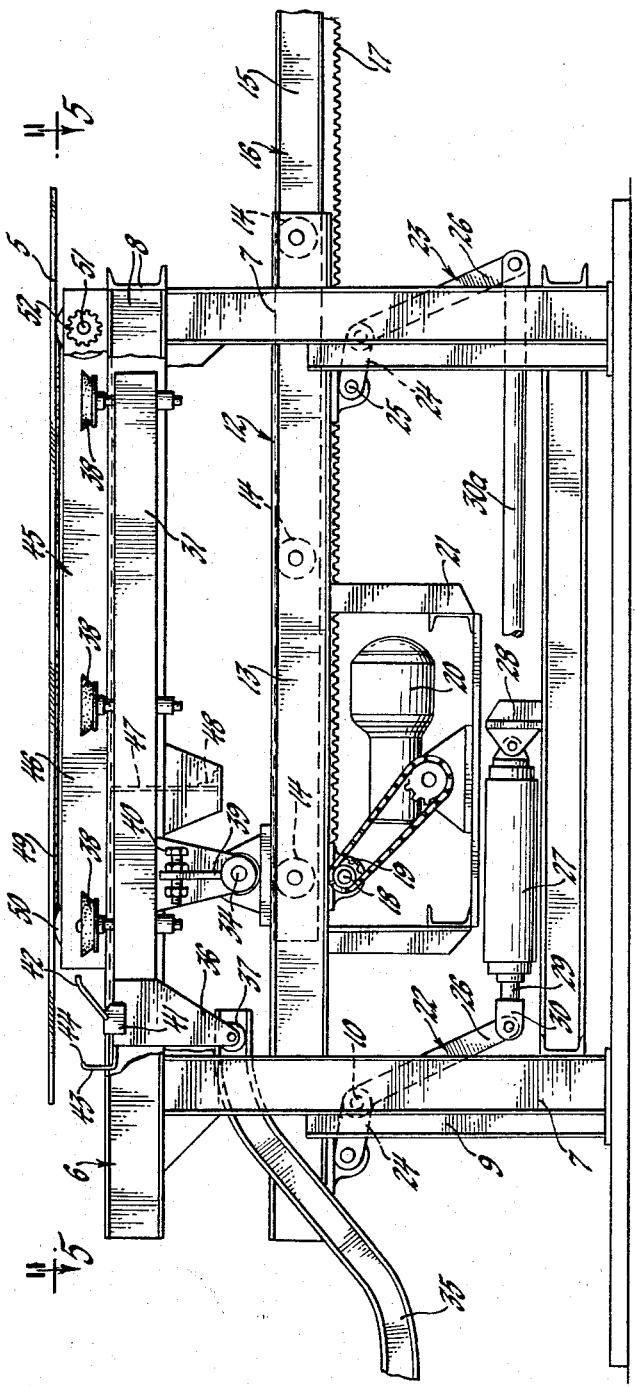
FIGURE 6 is a side elevation of the unstacker station with the pickup arm assembly in its retracted or at rest position as it would appear following the placement of a sheet of glass upon the station.

The glass-cutting machine comprises six primary stations, which are serially connected to one another and cooperate in such manner that large single sheets of glass which are picked up by the initial or unstacker station emerge from the terminal or stacker station in the form of a plurality of cut panes or lights. The above operation normally transpires without the intervention of any manual effort on the part of the single operator employed to oversee the apparatus.

Station A comprises the unstacker and includes means in the form of a reciprocal carriage having attached thereto pivotal pick-up arms for receiving large sheets of uncut glass, one at a time, from a turn-table storage area adjacent the unstacker station. The storage area comprises a turn-table T having four supply positions thereon, each position capable of retaining a plurality of substantially vertically disposed sheets of glass. The pivotal arms of the unstacker are adapted to reach out and pick up one sheet of glass from the storage area at a time and to position said sheet upon a horizontal portion of the unstacker station. The pick-up assembly of the unstacker includes automatic means for determining when the last sheet is removed from any one supply position of the turn-table. This automatic means causes the turn-table to rotate 90° or to the next supply position containing a supply of vertically disposed uncut glass sheets, whereby there is no interruption to the operation of the glass-cutting machinne.

As above described, the pick-up arms of the unstacker remove the large sheets of glass from the turn-table storage area and place them upon a horizontal table included in the unstacker station. Motive means are provided in conjunction with the horizontal table to automatically propel a sheet of glass disposed thereupon to the next, or reject station.

The reject station, generally designated B, comprises a normally horizontally disposed table including motive means thereon for advancing the sheet of glass received from the unstacker station. The horizontal table of the reject station is provided with means actuated by the operator for pivoting the table out of its normal horizontal plane such that any sheet of glass received from the unstacker which is apparent to the operator to be cracked or otherwise unusable, may be mechanically removed from the station and thereby prevented from further advancement through the machine. This rejection by the operator takes place without any interruption to the following stations in the apparatus or the output of the machine so that the only interruption is the minute delay caused while the unstacker table advances the next sheet to the reject station. The arrangement which insures no delay in the machine output will be described hereinafter.

The sheets of glass are next fed to a storage and alignment station, generally designated C, whereby the sheets are automatically aligned laterally and thereafter stored or retained until the previous sheet has passed through the next following, or cutting station.

When the cutting station, generally designated D, has completed its operations upon one sheet, the next sheet is automatically advanced onto the cutting station from the storage and alignment station C. As the sheet is fed onto the cutting table of the cutting station it is automatically stopped when it is properly positioned with respect to its direction of travel. Means are then actuated to align the sheet longitudinally. This means includes a squaring device along one side of the cutting station for evening up that side of the sheet adjacent to the side which was aligned at the storage and alignment station C. It will thus be seen that the sheet is properly aligned in both directions after it has been directed onto the cutting table. Subsequent to these operations one of two scoring or cutting bridges mounted on this station traverses the sheet of glass to make the desired cuts in one direction. Next, a second bridge traverses the sheet of glass in a direction transverse to that of the first cutting bridge to provide the necessary cuts in the other direction. Suitable breaking means are actuated during the cutting movements to break off the edges of the glass opposite those edges which were aligned when the sheet was initially fed onto the cutting station.

It will thus be understood that after the sheet is disposed upon the cutting table, two sides thereof will have been squared-up and that after both the transverse and longitudinal cutting bridges have made their scoring passes, and the breaking means are actuated, all four sides of the sheet will have been squared-up and the large sheet will have the desired longitudinal and transverse scores or cuts with the unwanted excess glass having been removed by the breaking means.

Motive means are included in the cutting station for advancing the large sheet of cut glass to a corner, or transfer station, generally designated E. As the sheet passes from the cutting to transfer station the longitudinal cuts therein are broken by means of breaker rolls disposed between the cutting and transfer stations. Conveyor means mounted on the transfer station advances these cut panes of glass after they have been broken along the longitudinal cuts. Additional conveyor means then picks up the partially cut lights and advances them in a right-angled direction relative to the initial direction of travel on this station, toward the final or stacker station, generally designated F.

A second set of breaker rolls are disposed between the transfer and stacker stations for the purpose of breaking the transverse cuts in the glass sheet. It will now be seen that as the glass is received at the stacker station F it will have been broken in both directions to provide the desired number and sizes of individual panes or lights. Conveyor means incorporated in the stacker station advances the cut lights to one end of this station. At this end of the station there is included a unique stacking mechanism which automatically picks up the cut lights as they reach the end of the conveyor means and places each light upon suitable stacking frames which are automatically advanced each time a light is disposed thereupon. When these stacking frames are filled with cut glass they may be quickly removed with, for example, fork-lift trucks or mounted upon roller conveyors so that they may be pulled away from the machine. The loaded stacking frames are immediately replaced with empty ones so that there will be no interruption to the operation of the machine.

Referring now to the more specific structure of the invention, a detailed description of the various stations thereof, will now follow:

Supply turn-table and unstacker

In order to provide a continuous supply of large sheets of glass to the unstacker station A a supply turn-table T is provided adjacent to the initial or unstacker station. The turn-table comprises a circular platform 1 rotatably mounted upon a base 2 and including means therein (not shown) for rotating the platform about its center axis. A center support 3 having the configuration of a truncated four-sided pyramid is mounted upon the platform 1. Each of the sides 4 of the support 3 is disposed with its bottom edge spaced inwardly from the periphery of the platform 1 to provide a supporting surface for the large sheets of uncut glass 5. Before beginning operation of the apparatus, sheet glass 5 from the drawing machine is transported to the supply turn-table and placed into position in stacked relationship against the inclined sides 4 as shown in FIGURES 1 and 2.

The unstacker A, shown in FIGURES 4–7, is positioned in juxtaposed relationship to the supply turn-table T, and includes novel means for picking up the sheets of glass 5 one at a time from the turn-table T, which pickup means thereupon transfers the sheet to conveyor means on the station for subsequent delivery to the next station of the apparatus.

The unstacker station includes a stationary supporting frame 6 having contained therein a pair of movable frame assemblies for actuating the pickup means to deliver the sheets of glass to the conveyor means. The stationary frame assembly 6 includes a plurality of corner posts 7 interconnected by means of horizontally disposed top posts 8. Mounted between each pair of vertical corner posts 7 and forming a part of the stationary frame assembly 6 are a pair of vertically disposed lift frame supports 9. A shaft 10 extends between the forwardmost pair of lift frame supports 9 and is journalled therewithin for rotary movement, while a similar shaft 11 is likewise disposed and mounted between the rearward pair of lift frame supports 9.

Figure 8:
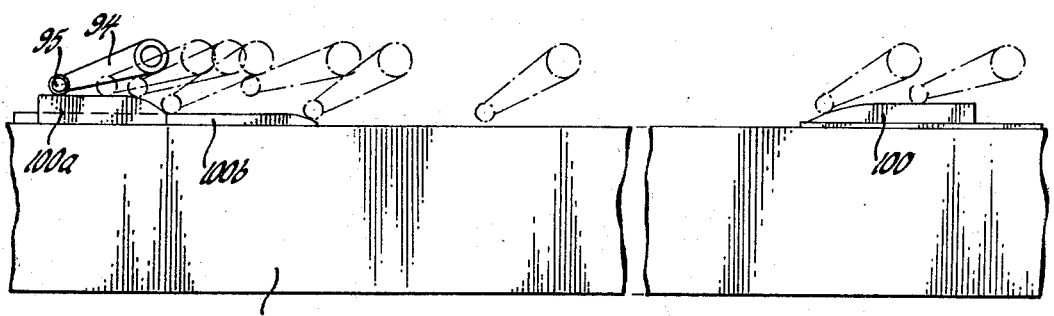
FIGURE 8 is a vertical section taken on the line 8—8 in FIGURE 4.

An oscillating lift frame assembly, generally designated 12, includes a pair of parallel spaced apart channels 13, 13, each provided with a plurality of rollers 14 suitably supported by the side channels 13. As will be seen in FIGURE 8, the rollers 14 are supported upon the inner or opposed faces of the channels 13 for the purpose of supporting a pair of side channels 15, 15 forming part of the reciprocating pickup frame assembly generally designated 16.

As most clearly shown in FIGURE 4, the bottom surface of the side channel members 15 are each provided with a gear rack 16 extending substantially the full length of the side channels. In order to impart reciprocating movement to the pickup frame assembly 16, a gear drive 18 is provided and supported by means of a pillow block 19 suitably anchored with respect to the lift frame assembly 12. It will be understood that the gear drive 18 is in constant mesh with the related rack 17. Suitable means for actuating the gear drive 18 to reciprocate the pickup frame assembly 16 are shown and include a motor 20 supported by the motor mount sub-frame, generally designated 21, which is anchored with respect to the channels 13 of the lift frame assembly 12.

In order to impart the desired oscillatory movement during operation of this station, the combined weight of the pickup frame assembly 16 and lift frame assembly 12 is supported by means of the shafts 10 and 11 journalled within the lift frame supports 9. This support is achieved by means of a pair of bell cranks 22 fixedly attached such as by keying, to the shaft 10 and also a pair of similar bell cranks 23 likewise secured to the shaft 11. The short arms 24 of all four bell cranks are pivotally attached as at 25 to the channels 13 of the lift frame assembly 12. It will thus be seen that the weight of the lift frame and pickup frame assemblies will be borne by the bell cranks 22 and 23 and that pivotal movement of the long arms 26 of the bell cranks will be translated as oscillating movement at the pivot points 25 on the lift frame assembly.

Suitable motive means such as the air cylinder 27 is employed to actuate the bell cranks 22 and 23. As most clearly shown in FIGURES 4 and 5, the air cylinder is pivotally attached at one end to a cylinder support 28 which in turn is fixedly disposed with respect to the stationary frame assembly 6. The piston rod 29 projects from the opposite end of the cylinder 27 and is pivotally connected by means of a clevis 30 to the free end of the long arm 26 of one of the bell cranks 22. Inasmuch as each pair of bell cranks 22 and 23 respectively is secured to its respective shaft 10 or 11, it will follow that any arcuate movement imparted to the bell crank 22 as shown in FIGURE 4 by the cylinder 27 will be translate as equal or corresponding movement to the other bell crank 22 attached to the opposite end of the shaft 10. In order to utilize the force of but a single air cylinder 27 for the purpose of actuating all four bell cranks, a tie rod 31 is connected to the long arm 26 of the bell crank 22 not having the cylinder 27 attached thereto. The rear end of the tie rod 31 is then connected to the end of the long arm 26 of one of the bell cranks 23. Since both arms of all four bell cranks are of equal configuration, it will thus follow that any movement directed to the one arm 26 attached to the piston rod 29 of the cylinder 27 will be translated as simultaneous equal movement to the remaining three bell cranks. By this manner of construction, it will be seen that since the shafts 10 and 11 are mounted in a single horizontal plane, the pickup and lift frame assemblies which are entirely supported by means of the pivot points will be maintained in a perfectly horizontal or level position regardless of the arcuate displacement of the bell cranks 22 and 23 about the shafts 10 and 11 respectively.

As will be most clearly see from FIGURES 4, 5, and 7, the pickup frame assembly 16 includes a plurality of pickup arms 31, each of which is provided with an offset mounting bracket 32. Mounted atop the forward ends of the side channel members 15 of the pickup frame assembly are a pair of pillow blocks 33, through which is journalled a pickup arm pivot shaft 34. The free end of each of the offset mounting brackets 32 is fixedly attached to the pivot shaft 34 by any suitable means such as welding or keying. By this means, the three pickup arms 31 will be retained in a single plane regardless of the pivotal relationship of the pickup arms with respect to the shaft 34.

From the previous description, it will be seen that the pickup arms 31 may be readily moved to or from the stacked glass sheets 5 by actuation of the motor 20 since the gear drive 18 is in constant mesh with the rack 17 integrally attached to the frame assembly 16. The means will now be described for controlling the arcuate or pivotal movement of the pickup arms 31 during the aforesaid reciprocation of the frame assembly 16.

Secured to the outer face of each of the channels 13 is an S-shaped guide track 35 providing an outwardly facing guide channel. When in the raised or uppermost position such as shown in FIGURE 4, the two outermost pickup arms 31 are positioned with their lower ends disposed slightly to the outside of the channels of the guide tracks 35. Attached to these lowermost ends are roller brackets 36, each of which has a guide roller 37 rotatably mounted on the inner face of the free end thereof and disposed within the guide track 35.

When the unstacker station is in its at rest position prior to actuation for picking up and receiving a sheet 5 of glass, the structure will appear as in FIGURE 6, wherein it will be seen that the pickup arms 31 will be fully retracted into the frame assembly 6 and disposed in a horizontal position therein. At this point, the reciprocating pickup frame assembly 16 is fully withdrawn by means of the motor 20 with the guide rollers 37 adjacent the limits of the upper portions of the guide tracks 35. The lift frame assembly 12 together with its attached guide tracks 35, and the reciprocating pickup frame assembly will all be in the lowestmost position since the piston rod 29 of the air cylinder 27 is fully retracted when the station is in this position.

When the apparatus is operated, the reciprocating pickup frame assembly 16 is driven outwardly from its nesting relationship between the lift frame assembly channels 13 by means of the gear drive 18 to the position shown in FIGURE 4. As the side channel members 15 are extended from between the lift frame channels 13, the pickup arms 31 are not only moved towards the stacked glass sheets 5 by means of the pivot shaft 34, but are also pivoted about said shaft into an upwardly inclined position as shown in FIGURE 4, due to the arcuate displacement of the ends of the pickup arms 31 caused by camming of the rollers 37 within the giude tracks 35. This movement may be readily understood in view of the S-curve of the tracks which dip downwardly from the at rest position above the lift frame assembly to a point substantially below the lift frame assembly.

For picking up the sheet glass 5, each of the arms 31 is provided with a plurality of vacuum cups 38 of well-known design. Suitable vacuum supply means (not shown) is connected to each of the vacuum cups 38, as is well known in the art. In order to provide positive stop means to limit the arcuate or pivotal movement of the pickup arms 31 as the pickup frame assembly 16 is extended from the stationary frame, a stop plate 39 secured to the inner side wall of the two outermost mounting brackets 32 is provided with adjustable means such as threaded bolts 40 having lock nuts thereon for selective positioning thereof to provide an abutment with the top of the side channel members 15 when the pickup arms have assumed the desired vertical position.

Means in the form of limit switches are provided on the lower portion of the arms 31 to turn off the motor 20 when the pickup frame assembly 16 has been extended outwardly the proper distance. The limit switch 41 is provided with a trigger or actuating finger 42 normally disposed beyond the faces of the vacuum cups 38. By this arrangement, it will be seen that the limit switch 41, which is normally open, will not be closed by the finger 42 until the pickup arms 31 have been projected outwardly into close proximity with the outermost sheet of glass 5 disposed on the turn-table T. When the trigger 42 strikes the outermost sheet of glass 5, the motor 20 will cease to operate just as the vacuum cups 38 are pressed into engagement with the glass sheet. Concurrently, the limit switch 41 may be utilized to open the vacuum supply to the cups 38 to cause the glass 5 to become securely anchored to said cups. When the glass is securely gripped by the vacuum actuated cups 38, the air cylinder 27 is actuated to drive the piston rod 29 outward or forwardly from the cyclinder 27 to cause actuation of all four bell cranks 22 and 23, as previously described. Reference should be made to FIGURE 7 to clearly understand this present movement, wherein the subsequent oscillatory displacement of the combined lift frame assembly 12, guide tracks 35 and pickup frame assembly 16 is shown. As seen in the left-hand portion of this figure the pickup arms 31 are concurrently elevated and retracted due to the action of the bell cranks mounted on the shafts 10 and 11. At the time the air cylinder 27 is actuated, jets of pressurized air are emitted from a plurality of air lines 43 mounted on the lower portion of the arms 31 and having their outlets 44 projecting upwardly at a point beneath the lowermost edges of the stacked sheets of glass. The positioning of these air lines 43 will be further clarified by referring back to FIGURE 1, wherein it will be seen that the lines, of rigid self-sustaining material, are disposed on the bottom portions of the two outermost pickup arms 31 and the outlets 44 thereof extend under the overhanging portions of the stacked sheets of glass. The positioning of the outlets 44 is somewhat critical in that they should be stationed so that when the pickup frame assembly 16 is extended all the way until the vacuum cups 38 have gripped the glass, the outlets 44 will be disposed beneath the line separating the outermost sheet of glass from the second stacked sheet of glass. In this manner it will be seen that as high pressure air is ejected through the upwardly directed outlets 44, this air will be forced between the two outermost sheets of glass to assist in breaking the natural suction or attraction between these two sheets of glass thereby assisting in the separation of the outer sheet of glass as the bell cranks 22 and 23 are actuated to retract and elevate the pickup arms 32. The aforementioned compound movement of the retracting arms 31, together with the air pressure injected between the two outermost sheets of glass assist in the easy separation and removal of the outer sheet while prohibiting any scratching of the juxtaposed glass surfaces.

When the apparatus is in the elevated retracted dotted line position, as shown in FIGURE 7, the motor 20 is reversed to retract the pickup frame assembly 16 and the loaded pickup arms 31 rearwardly into the stationary frame assembly 6. During this movement the rollers 37 as they are guided within the tracks 35 cause the pickup arms 31 to pivot or rotate in a clockwise direction as viewed in FIGURE 4, until the arms 31 are disposed parallel to, but above the plane of, the conveyor assembly generally designated 45. At this point, the motor 20 is turned off and the air cylinder 27 is actuated to retract the piston rod 29 thereby lowering the combined lift frame and pickup frame assemblies to the position shown in FIGURE 6. As the air cylinder 27 is actuated, the vacuum supply to the cups 38 is vented to the atmosphere to release the engagement between the glass sheet 5 and said cups thereby leaving the glass sheet 5 in the position shown in Figure 6 upon the conveyor means.

The conveyor assembly 45 is adapted to receive the sheets of glass 5 from the pickup arms 31 as described hereinabove and to deliver these sheets to the next station of the apparatus. This conveyor assembly comprises a plurality of belt trays 46 interspaced between the three pickup arms 31 so that said arms may be passed therebetween during the actuation thereof. Each of the belt trays 46 is suitably secured at the rear edge thereof to the rear transversely disposed top post 8 and may be supported adjacent the opposite end thereof by suitable braces 47 in turn secured to an angle member 48 extending the width of the supporting frame assembly 6.

Each of the belt trays 46 includes a conveyor belt 49 of the endless type which is sheaved about a pair of belt rollers 50 disposed at opposite ends of the belt tray. In order to concurrently drive all of the belts 49 a common shaft 51 is fixedly attached to each of the rollers 50 at one end of the belt trays 46. Suitable means such as a roller chain sprocket 52 is connected at one end of the shaft 51 for the purpose of connecting to a drive motor for actuating the conveyor belts 49.

The limit switches 41 disposed at the lower ends of pickup arms 41 may be utilized to fully automate the process of unstacking all sheets of glass 5 contained on all four sides of the turn-table T. From the previous description it will be understood that the extension of the reciprocating pickup frame assembly 16 from within the lift frame assembly 12 is terminated when the trigger finger 42 of the limit switch 41 contacts a sheet 5 of glass stacked upon the turn-table. After the last sheet of glass 5 stacked against any one side 4 of the turn-table has been removed it will be apparent that the pick-up frame assembly 16 will be fully extended without the trigger fingers 42 engaging any sheet of glass. When this occurs the motor 20, through the gear drive 18, continues to drive the pickup frame all the way from within the lift frame assembly 12 to its maximum predetermined limit which obviously would be a point at which the vacuum cups 38 would just begin to engage the exposed face of the side wall 4 of the turn-table. When this occurs, the drive means (not shown) contained within the base 2 of the turn-table will be actuated to rotate the platform 1 90 degrees in order to present a fresh stack of glass sheets 5 in juxtaposed relationship to the end of the unstacker station.

By thus operating the unstacker station and supply turntable it is possible to at all times present sheets of glass in opposed relationship to the pivotal pickup arms 31 since even when the apparatus is operating at full speed there is ample time to deposit sheets of glass upon an exposed side wall 4 of the turn table before the turn-table has revolved a full 360 degrees to again present the same side 4 to the unstacker station.

As the pickup arms 31 are lowered between the belt trays 46 suitable drive means (not shown) connected with the sprocket 52 actuates the belts 49 to advance the sheet of glass 5 from the unstacker station to the next station in line in the apparatus.

*Reject station*

The reject station, generally designated B, is disposed adjacent to the rear end of the unstacker station and includes a stationary frame 53 within which is pivotally mounted a reject frame 54 containing a plurality of conveyor rollers 55 journalled therein. The foregoing structure will be apparent upon a review of FIGURES 1 and 2 wherein it will be seen that the top surfaces of the conveyor rollers 55 are disposed in the same horizontal plane as the top of the conveyor belts 49 of the unstacker station. Conventional driving means are included for concurrently rotating all of the rollers 55 to continue the advancement of each sheet of glass 5 as it is received from the unstacker station.

The purpose of the reject station is to enable an operator who is constantly observing the sheets of glass being directed onto this station an opportunity to quickly inspect the condition of the glass sheet before it is advanced to the subsequent station. Whenever a cracked or otherwise faulty sheet 5 is received onto the rollers 55 of the reject station, this fact is instantly observed by the operator who then by means at his control can reject the glass sheet before it is advanced to the next station in line. This rejection is accomplished by means of the pivotal mounting of the reject frame 54 which preferably is journalled at its medial portion 56 to the outer or stationary frame 53. As shown in FIGURE 2 an air or hydraulic cylinder 57 is pivotally attached at one end in fixed relation to the stationary frame 53 of the reject station and includes a piston rod 58 pivotally attached to the rear edge of the reject frame 54. When the operator observes a defective sheet of glass 5 being conveyed onto the reject station B, the cylinder 57 is actuated to retract the piston rod 58 thereby pivoting the frame 54 about the point 56 to direct the defective glass sheet downwardly towards suitable collecting means such as a reject pit P disposed beneath the apparatus.

Notwithstanding a defective glass sheet, the glass will be advanced by the power conveyor rollers 55 in a horizontal plane towards the next station in line.

*Storage and alignment station*

Figure 9:
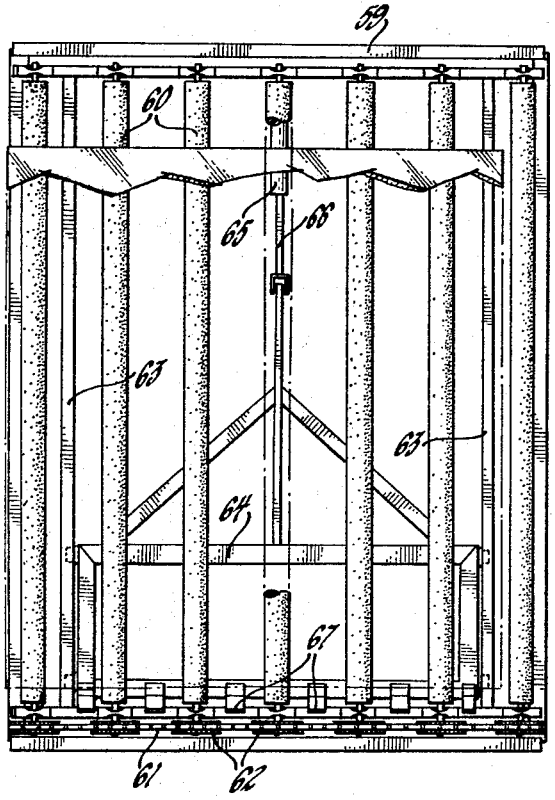
FIGURE 9 is a top plane view, partly broken away, of the storage and alignment station.

This station is disposed adjacent the rear edge of the reject station B and includes, as will be most clearly seen in FIGURE 9, the stationary frame 59 upon which are journalled a plurality of conveyor rollers 60 having their top surfaces in the same horizontal plane as those of the conveyor means contained in the preceding stations for the purpose of receiving sheets of glass 5 from the reject station B. As in the preceding stations, each of the rollers 60 are provided with common drive means at one end thereof such as the roller chain 61 and individual sprockets 62. As a sheet of glass 5 is received from the reject station B it is carried onto the storage and alignment station C by means of the rollers 60 until the entire sheet overlies the rollers of this station whereupon the means driving the roller chain 61 is turned off. By the time the glass sheet is directed onto this station it is rarely if ever perfectly aligned with respect to the direction of travel. The misalignment at this point is inevitable for even though the glass itself may be square on all four sides and there was no slippage or displacement thereof during the unstacking procedure, nevertheless there is bound to be some angular displacement of the sheet of glass during its travel upon the various conveyor means of the preceding stations. Accordingly means are herein provided for squaring up or aligning at least one side edge of the glass sheet 5 prior to the advancement of the sheet to the next, or cutting station.

Mounted between a pair of guide channels 63 fixedly attached to the stationary frame 59 is a reciprocating alignment frame 64. Reciprocating movement is imparted to this frame 64 by means of an air cylinder 65 secured at one end to the stationary frame 59 and having its piston rod 66 attached to the medial portion of the alignment frame. The foregoing structure relating to the alignment frame is disposed beneath the conveyor rollers 60 while projecting upwardly from the alignment frame 64 and between the rollers 60 are a plurality of alignment fingers 67 which extend a slight distance above the top surface of the rollers 60.

When a glass sheet has been conveyed completely onto the rollers 60 of this station the air cylinder 65 is actuated to retract the piston rod 66 and thereby move all of the alignment fingers 67 in a direction toward the opposite or upper side of the stationary frame 59 as viewed in FIGURE 9. Inasmuch as all of the fingers 67 are axially aligned with respect to the direction of advancement of the glass sheets it will be seen that although the glass sheet 5 may have been received by this station in an axially displaced position it will be forced into correct alignment by means of the reciprocating alignment fingers 67. By regulating the control means for actuating the piston rod 66 of the cylinder 65 or by any other adjustable means such as a turnbuckle etc. disposed between the piston rod 66 and the alignment frame 64 it is possible to adjust the limits of travel of the reciprocating alignment fingers 67 in order to selectively position the resultant position of the aligned sheet of glass.

A motor-driven roller conveyor assembly 68 (see FIGURE 2 is mounted within the stationary frame 59 of this station beneath the level of the rollers 60 and disposed in an inclined position leading from the level of the reject frame 54 of the reject station B when in its pivoted position, down to the reject pit P disposed beneath the next station in line.

*Cutting station*

The cutting station includes means for producing the score or cuts on a single large sheet of glass in order to provide the desired size and number of individual lights. Cutting means are provided for forming these cuts both longitudinally and transversely of the sheet of glass 5 received from the storage and alignment station C. After the alignment of the sheet 5 in the station C the powered rollers 60 therein are again activated in order to advance the glass sheet onto the cutting station D. As the sheet is advanced over the station D, conveyor means are actuated to engage the undersurface of the glass sheet to continue its travel onto the cutting station. Disposed within an outer stationary frame 69 are a plurality of belt conveyors 70 aligned longitudinally with respect to the direction of travel of the oncoming glass sheet as it is received from the storage and alignment station C. Pulleys 71 around which one end of each of the belts is sheaved are keyed to the common shaft 72 having suitable means for driving same for the purpose of actuating the belts. A support plate 73 likewise extends beneath each of the belts 70 substantially the entire length thereof for reasons which will become obvious hereinafter. Suitable means (not shown) well known in the art are employed for raising and lowering the belt conveyors 70 is unison to bring the top surfaces thereof into engagement with the undersurface of the sheet of glass being directed to the cutting station from the preceding or storage and alignment station. Thus it will be understood that the belt conveyors 70 and their above described attendant structure are elevated, and the drive means for the shaft 72 is actuated, as a sheet of glass is received by the cutting station, the belts 70 continuing their advancement until the leadingmost edge of the glass sheet reaches a predetermined point within the cutting station. The limit of the advancing sheet of glass may be regulated by any suitable automatic means such as the actuating finger of a limit switch or by electronic or acoustical sensing means such as a Sonac beam as represented by 74.

A cutting table generally designated 75 extends throughout a substantial area of this station and comprises a plurality of coplanar table segments 76, a plurality of which are mounted in fixed relationship to the stationary frame 69 between each of the belt conveyors 70. These table segments 76 which are disposed in a plane slightly below the level of the top surface of the conveyor rollers 60 of the preceding station, are preferably covered with rubber or any suitable non-abrasive composition offering a substantially firm and non-damaging supporting surface for the sheet glass as it is subsequently cut.

As previously described, the belt conveyors 70 are elevated to advance a sheet of glass onto this station. When this advancement has been completed the conveyors 70 are halted and lowered to place the glass sheet 5 upon the top of the table segments 76 comprising the cutting table. At this point alignment means are actuated for squaring up the sheet of glass along a side adjacent to that side which was squared at the preceding station. This means comprises a pair of laterally-spaced screw shafts 77 journalled for rotary and reciprocating movement below the level of the table segments 76 and including traveling blocks 77a mounted thereon. Projecting upwardly from one end of each traveling block 77a is an alignment finger 78 having its top surface disposed slightly above the plane of the table segments 76. The fingers 78 are initially positioned relative to the capping size of the sheet glass 5 by rotating the shafts 77 by any suitable means such as a hand crank connected through helical gearing (not shown) to the shaft. The reciprocating movement is permitted by mounting the shafts 77 in bushed relationship through gudgeons 77c fixed to the table. Suitable motor driven crank means (not shown) are attached to the blocks 77a to cause reciprocating movement of the blocks and their shafts. From the foregoing it will be seen that when a glass sheet has been lowered onto the table 75 by the lowering of the belt conveyors 70 the sheet may be thereafter aligned by actuation of the traveling blocks 77a to move the upwardly projecting alignment fingers 78 thereon towards the edge of the glass sheet. Following the alignment stroke, the traveling blocks 77a are immediately returned to their original or starting position so that the subsequent sheet of glass may be lowered onto the table 75 without engaging the fingers 78 while being on-loaded by the belts 70.

When the alignment fingers 78 have returned to their normal starting position the glass will have been squared along two adjacent sides. At this point one of two cutting bridges traverses the width of the glass sheet to produce the desired score marks or cuts in one direction upon the glass.

As viewed in FIGURE 10 it will be seen that the cutting station stationary frame 69 comprises a short and a long dimension. Disposed across the short dimension of the station is a short cutting bridge generally designated 79 which is guided and supported at its opposite ends by means of the side channels 69a and 69b. As shown in FIGURE 11 the short cutting bridge 79 is provided with one or more cutter blocks 80 having suitable glass cutters 81 of known construction projecting downwardly therefrom. Each end of the cutting bridge 79 is provided with a depending support bracket 82c, the free end of which is provided with a drive block 82 to which are attached a plurality of pairs of downwardly diverging guide rollers 84. As will be seen in FIGURE 13 the end of the bracket 82 to which the drive block and guide rollers 84 are attached is disposed within the side channel 69a. Secured within this channel is a V-block 85 having a pair of upwardly converging support surfaces upon which the guide rollers 84 rest. Understanding that both ends of the cutting bridge 79 are provided with the above described supporting structure it will be seen that means are herein provided for supporting and guiding the cutting bridge during its travel between the side channels 69a and 69b. Any suitable means for providing rectilinear movement of the cutting bridge such as a flexible chain or cable may be fixedly attached to the ear 86 formed on the drive block 83, said means in turn being sheaved about a suitable drive wheel connected to the sprocket 87 shown in FIGURE 11 it being understood that the cable would pass around a suitable wheel disposed within the opposite end of the channel.

A pair of bearing blocks 88 are mounted adjacent the rear edge of both of the support brackets 82 on the cutting bridge. A cutter bar 89 extending the length of the bridge is disposed within the bearing blocks 88 and adapted to rotate therein. A plurality of the aforementioned cutter blocks 80 are movably attached to the cutter bar 89 and may be adjustably disposed thereon to permit selective positioning of the glass cutters 81 projecting downwardly from the cutter blocks. Having laterally positioned the cutter blocks 80 to produce the desired spacing between the scores or cuts, for the purpose of obtaining the desired size lights, suitable motor means (not shown) is then actuated to turn the drive sprocket 87. In this manner the short cutting bridge 79 will be caused to traverse the length of the side channels 69a and 69b with the cutters 81 bearing down upon the top surface of the glass sheet 5 supported upon the table 75.

Each of the cutter blocks 80 comprises a pair of block sections 90 and 91 the former being slidably attached to the cutter bar 89 and the latter hingedly attached at 92 to the former (FIGURES 11 and 12). In order to maintain a positive downward force upon the glass cutters 81 a compression spring 93 secured at its upward end to the slidable block section 90 bears downwardly on its opposite end against the top of the hinged block section 91.

Figure 18:
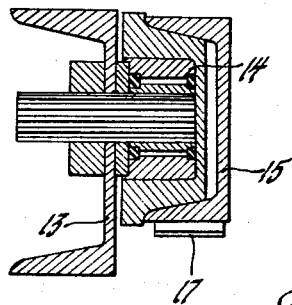
FIGURE 18 is an elevational view of the cam actuators for the mechanism of FIGURE 12.

As the short cutting bridge 79 begins to traverse the length of the cutting table 75 the glass cutters 81 supported at the free ends of the hinged block section 91 are lowered onto the nearest edge of the glass sheet 5 and the desired cuts are produced in the glass sheet. As the bridge approaches the far limits of its travel at the opposite side of the cutting table the cutters 81 are automatically elevated above the plane of the glass sheet by means of the mechanism illustrated in FIGURE 12 and incorporated at one end of the bridge 79 above the top of the side channel 69a. This cutter actuating mechanism comprises a crank arm 94 fixedly attached to the end of the cutter bar 89 and having a cam roller 95 rotatively mounted at the free end thereof just above the top surface of the side channel 69a. The cutter block assemblies 80 are normally spring urged downwardly as a unit into glass engaging position by means of a compression spring 96 fixedly attached at one end to the cutting bridge as at 97 and having its other end biasing against a spring plate 98 integrally attached to the crank arm 94 adjacent the cutter bar 89. An adjustable stop 98a attached to the end of the cutting bridge projects outwardly therefrom and into the path of a lock bar 99 depending from the crank arm 94 in the vicinity of the cutter bar 89. As will be seen from FIGURE 12 the angular displacement of the crank arm 94 is limited by the engagement of its lock bar 89 with the adjustable stop 98a, which stop is adjusted to achieve the correct downward projection of the ends of the glass cutters 81 in accordance with the thickness of the glass sheet being used. As the cutting bridge 79 reaches the end of its traversing pass to the left of the station as viewed in FIGURE 11 the cam roller 95 will engage and be vertically displaced by the longitudinal cam track 100 with the result that the crank arm 94 will be arcuately displaced in a clockwise direction as viewed in FIGURE 12. This elevation of the crank arm 94 together with the cutters 81 causes a similar arcuate displacement of the lock bar 99 the free end of which will be moved away from the raised portion 101 of the pivotally mounted lock dog 102 secured to the end of the cutting bridge. As the lock dog 102 is thus displaced the heavier free end of the dog causes the lighter and shorter end to move upwardly until the notch 103 therein is immediately beneath the free end of the lock bar 99. Subsequently when the short cutting bridge 79 begins its return travel across the cutting table 75 it will be seen that the cutters will be retained in their elevated position by means of engagement of the lock bar 99 within the notch 103 of the pivotal dog 102 even though the cam roller 95 will no longer be supported by means of the longitudinal cam 100. In this manner contact between the cutters 81 and the previously scored glass sheet 5 will be prevented. As the bridge returns to its starting position as shown in FIGURE 10, the roller 95 rides up another cam 100a disposed on the side channel 69a as shown in FIGURE 18. The cam 100a is higher than the cam 100 at the far end of the station and causes the lock bar 99 to be moved out of the notch 103 while at the same time another cam 100b engages the depending long end of the dog 102 to pivot same thereby lowering the notch 103 away from the proximity of the lock bar 99. The foregoing independent actuation of the dog and cam roller is due to the fact that these two elements are laterally displaced with respect to each other similar to the laterally disposed cams 100a and 100b. When the cutting bridge 79 begins its next pass across the station, it will be seen that the cam 100b, which extends beyond the cam 100a, will retain the notch 103 away from possible engagement with the lock bar 99 until after the cam 100a has lowered the roller 95 and cutters 81 onto the glass.

By providing any suitable means for adjustably positioning the cams 100, 100a and 100b longitudinally along the top of the side channel 69a, such as a plurality of countersunk bolt holes therethrough, it will be seen that the point at which the cutters 81 are lowered and raised may be altered according to the size glass sheet being handled.

Before, however, the above return travel of the short cutting bridge 79 takes place, a second, or long cutting bridge 104 is actuated to produce a plurality of scores or cuts in the sheet glass transverse to those cuts produced by the travel of the short cutting bridge 79.

Figure 14:
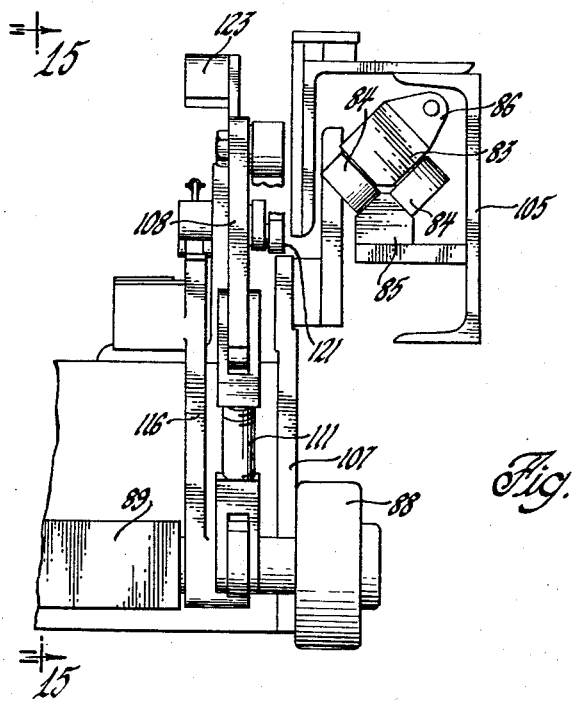
FIGURE 14 is a vertical sectional view taken along the line 14—14 of FIGURE 10 and illustrating the actuating means for the cutters of the long bridge.
Figure 17:
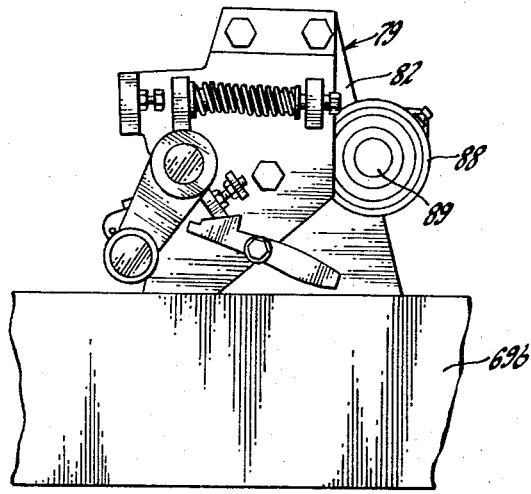
FIGURE 17 is an end elevation of the actuating mechanism for the rollers shown in FIGURE 16.

The long cutting bridge 104 is basically of the same construction as the previously described short cutting bridge 79 and includes a plurality of cutter blocks 80 slidably and adjustably mounted upon a cutter bar 89 journalled within bearing blocks 88 supported at either end of the cutting bridge. The long cutting bridge 104 is supported and guided within a pair of spaced apart end channels 105 and 106 secured to the stationary frame 69 at a level above the top of the short bridge 79. The long cutting bridge is suspended from within the end channels 105 and 106 by means of support brackets 107 secured to and projecting upwardly from the ends of the cutting bridge. Supporting and guiding means are disposed within the end channels similar to that utilized in connection with the support and guidance of the short cutting bridge 79 as illustrated in FIGURE 14.

Figure 15:
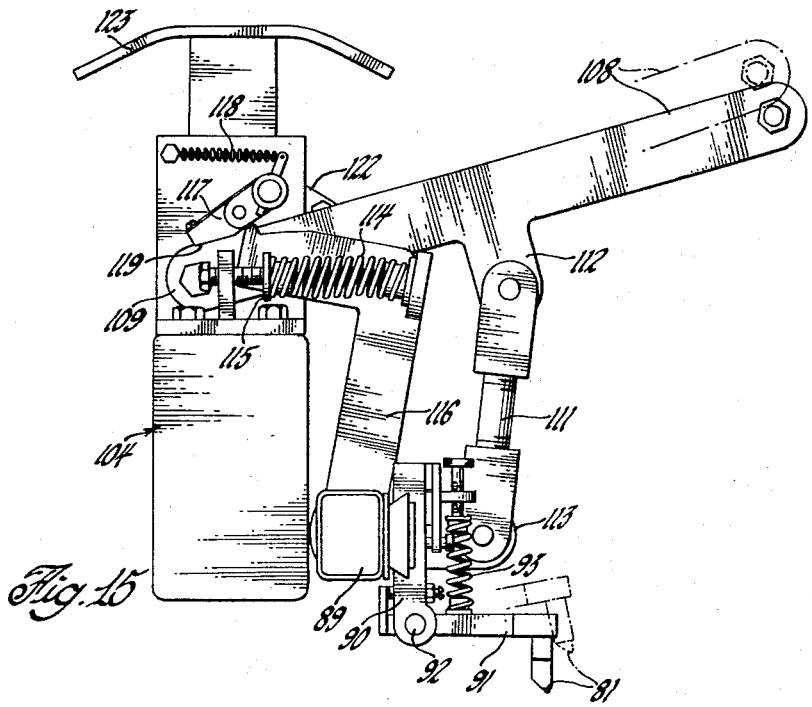
FIGURE 15 is a vertical sectional view taken along the line 15—15 of FIGURE 14 and including a cutter element shown in alternate positions.

After the short cutting bridge 79 has made its cutting pass from the right to the left of the station as viewed in FIGURE 11, the long cutting bridge 104 is actuated to traverse the cutting table 75 from its position shown at the the top of FIGURE 10 to the opposite side of the cutting station. During this movement, the cutters 81 are lowered into cutting position as they approach the edge of the glass sheet 5 and are elevated from the cutting position as the bridge 104 reaches the far limit of its cutting pass. Cam actuated lever means are also provided for raising and lowering the cutters 81 mounted upon the cutter bar 89 carried by the long cutting bridge in a manner similar to the cutters carried by the aforedescribed short cutting bridge. As will be seen in FIGURES 14 and 15 a roller lever 108 is pivotally attached as at 109 adjacent one end of the bridge 104, and is provided at its opposite end with a cam roller 110. A link rod 111 pivotally attached to an intermediate portion 112 of the roller lever 108 is further pivotally connected at its opposite lower end to a projecting arm 113 integral with the cutter bar 89. Maintaining the cutter assemblies in a normally downward or cutting position is a compression spring which on one end bears against an adjustable spring plate 115 attached to the top of the long cutter bridge and bearing on the other end against a lock arm 116 rigidly attached to the cutter bar 89. From the foregoing, it will be seen that the spring 114 will tend to urge the cutters 81 as well as the roller lever 108 to the full line position as shown in FIGURE 15. As the long cutting bridge reaches the end of its cutting path, suitable cam means (not shown) such as that disclosed in connection with the operation of the short cutting bridge 79, engages the undersurface of the cam roller 110 to deflect same upwardly to displace the roller lever 108 into the dotted line position as shown in FIGURE 15, which action, in view of the link rod 111, transmits this upward movement through the projecting arm 113 to the cutter bar 89 with the result that the cutters 81 are elevated to the dotted line position. The opposite ends of the link rod 111 are preferably provided with left and right-hand threads respectively, disposed with their mating right and left-hand threads within the related clevises such that the degree of elevation or depression of the hinged block sections 91 may be regulated by rotating the link rod 111 in the fashion of a turnbuckle. As will be seen in FIGURE 15, means are included for retaining the cutters 81 in the elevated position when the long cutting bridge 104 has completed its cutting pass and is returning to its starting position. This means comprises a dog 117 pivotally attached above the free end of the lock arm 116 and urged by means of an expansion spring 118 into a normal position with its locking nose 119 directed downwardly. In view of the mechanical advantage obtained through the aforementioned structure, upward displacement of the free end of the roller 108 produces a substantial pivoting of the lock arm 116 so that the locking notch 120 formed adjacent the free end thereof bears against the spring-urged locking nose 119 of the dog 117 to displace same whereupon the notch 120 will be engaged by and retained by the locking nose 119. In this manner, the cutters 81 mounted upon the cutter bar 89 of the long cutting bridge will be retained in an elevated position after the cutting pass.

The motive means engaging the ear 86 of the drive block 83 in association with the long cutting bridge is similar to the drive means previously described in connection with the short cutting bridge, the drive means being reversed after the cutting pass to return the long cutting bridge 104, with the cutters 81 thereon in their elevated position to the starting position as shown in FIGURE 10.

When the long cutting bridge 104 begins its cutting pass on the subsequent sheet of glass admitted to the cutting station, the cutters 81 are lowered upon the edge of the glass sheet by means of a suitable longitudinal cam (not shown) similar to that employed in the short cutting bridge. Said cam engages a cam roller 121 attached to the release lever 122 disposed behind and integrally connected with the pivot shaft of the pivotal dog 117 in order to deflect the release lever 122, thereby elevating the locking nose 119 to release therefrom the notch 120 on the lock arm 116 with the subsequent lowering of the cutters 81 by means of the compression spring 114.

Suitable limit switch means may be employed at the end of the travel of the long cutting bridge for stopping the movement thereof and automatically reversing the drive means ultimately connected to the ears 86 at either end of the bridge. In this connection an inclined trigger bar 123 projects upwardly from one end of the cutting bridge for engagement with and actuation of said limit switch.

After the return of the long bridge 104 to its starting position such as shown in FIGURE 10, all of the required cuts will have been made to the sheet of glass. Since various sizes of lights are required to be produced from a more or less standard overall size sheet of glass it will follow that it will be impossible to arrange the spacing of the various cutters on both the long and short cutting bridges so as to avoid the production of marginal waste portions. The present invention reduces the amount of waste glass produced at this station due to the prior alignment of the glass sheet, which alignment is performed using two adjacent sides of the sheet glass as reference points. Notwithstanding that every advantage will be made of the two squared sides of the glass sheet, it is rare if ever that it will not be necessary to trim waste material from two or three sides of the sheet. The stop limit means 74 utilized during the in-feeding of the glass sheet 5 onto the table 75 by the belt conveyors 70 produces a fixed reference point, which may be considered a clean edge during the subsequent cutting of the glass sheet.

After the long bridge 104 has returned to its starting position there will be produced by the two outermost cutters 81 carried by this bridge, a pair of cuts defining the marginal edges adjacent two sides of the glass sheet 5. Means are provided in the form of breaker bars 124 for removing this waste material immediately after the long bridge 104 has returned to its initial position. The breaker bars 124 consist of angle members disposed beyond the opposite ends of the table 75 and normally positioned in a plane below that of the table segments 76. After the two marginal cuts have been made by the pass of the long bridge 104 the crank arms 125 supporting both ends of each breaker bar 124 are actuated to swing the edges of the bars up, over, and down upon the ends of the glass sheet to snap off the marginal waste along the adjacent cuts, this waste glass material falling into suitable collection means disposed beneath the cutting station.

Figure 16:
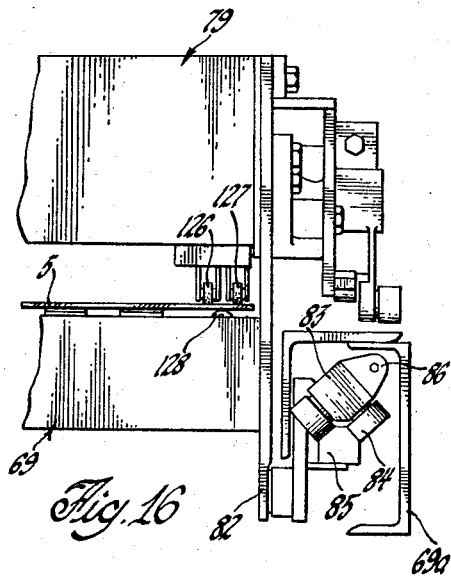
FIGURE 16 is a partial elevation of one end of the short bridge.

It is after the foregoing operations, that the short cutting bridge 79 with its cutters 81 in their elevated position begins its return travel to the starting position as previously described. Means are carried by one end of the short bridge for trimming off the marginal waste adjacent the edge of the sheet glass opposite that to the stop limit means 74. This means comprises a pair of spring-urged breaker rollers 126 and 127, which, during the return pass of the short bridge are brought to bear against the upper surface of the glass sheet 5. As will be seen in FIGURE 16, a supporting roller 128 is elevated by any suitable means into contact with the undersurface of the glass sheet at a point adjacent to the cut previously formed adjacent to the edge of the glass. One of the breaker rollers 126 bears against the top of the glass at a point opposite the supporting roller 128, while the other breaker roller 127 is spring-urged downwardly upon the glass adjacent the margin thereof. It will thus be understood, that before the short cutting bridge 79 has completed its return pass to its starting position, the force of the outermost roller 127 upon the overhanging marginal trim of the glass sheet will cause this portion of the glass to snap off thereby leaving a completely trimmed and cut sheet of glass ready for breaking of both the longitudinal and transverse cuts produced thereupon. At this point the cut sheet of glass 5 is removed from the cutting table 75 by means of a plurality of conveyor wheels 129. Referring to FIGURE 10, it will be seen that a single conveyor wheel shaft 130 is disposed between and on opposite sides of each of the belt conveyors 70, each of said shafts being provided with a plurality of the conveyor wheels 129. Suitable drive means such as roller chain sprockets 131 are secured to at least one of the ends of each of the shafts and cooperate with a common drive means (not shown) for rotating all of the conveyor wheels 129 in a direction towards the exit portion of the cutting station B.

After the short cutting bridge 79 has returned to its initial starting position as shown in FIGURE 10, the conveyor wheels 129 are all simultaneously elevated from their normal position beneath the plane of the cutting table 75 by conventional means well known in the art, for the purpose of directing the cut sheet of glass towards the right-hand end of the station as viewed in this figure. At the exit end of the cutting table 75 will be found a plurality of rubber covered rolls 132 having suitable common drive means such as roller chains and sprockets 133. The rolls 132 are all disposed with their top surfaces in a single horizontal plane substantially on a level with the sheet 5 of glass as it is being conveyed from the cutting table 75 by the elevated conveyor wheels 129. A pair of similar rubber covered rollers 134 are mounted above two of the intermediate rollers 132 and together these opposed rollers 132 and 134 securely grip and advance the cut sheet of glass as it is being directed therebetween. As the glass emerges from the second pair of opposed rollers 132 and 134, it passes over another lower roll 132 prior to engagement upon its upper surface by a breaker roll 135 adjustably disposed with its lower surface in a plane slightly below the plane of the top of the glass sheet emerging from between the preceding pinch rolls. As is well known in the art, this arrangement of an offset roll causes breaking of the glass sheet along each of the cuts parallel to the breaker roll 135 due to the flexure of the glass sheet caused by the vertically offset disposition of the breaker roll 135.

*Transfer station*

As the glass sheet 5 emerges from the breaker rolls 132, 134, and 135, the individual cut lights are deposited upon the moving conveyor belts 140 supported by the stationary frame 141 of the transfer station E. The endless conveyor belts 140 are each sheaved about a pair of oppositely disposed pulleys 142, all of the pulleys at either end of the station being fixedly attached to a common shaft powered by suitable motor means (not shown).

A desirable feature of the transfer station is that the surface speed of the belts 140 is slightly greater than the surface speed of the breaker rolls advancing the glass sheet 5 from the cutting station. In this manner, it will be seen that as the glass sheets are broken along the cuts made parallel to the breaker rolls, the resultant cut lights will be moved away from the glass sheet 5 still being advanced by the opposed breaker rolls, thereby forming an immediate gap between the opposed edges of the freshly broken lights to preclude the possibility of any damaging of the cut edges. When the entire glass sheet directed from the cutting station has been broken along the cuts made parallel to the breaker rolls, and the thusly cut lights are all disposed upon the conveyor belts 140 of the transfer station, the motor means driving the belts 140 is turned off.

At this point, a second conveying system within the station is actuated to direct the partially broken lights off of the transfer station in a direction at right angles to the on travel of the lights. The construction of this second conveying system will be more clearly observed by referring to FIGURE 20, wherein it will be seen that a subframe assembly 143 is nested within the outermost stationary frame 141 and includes actuating means for imparting a vertical reciprocating movement thereto for the purpose of raising and lowering a plurality of rubber covered conveyor rolls 144 carried thereby. Each of the rolls 144 are journalled within suitable bearing blocks 145 mounted atop the sub-frame assembly 143. One end of each of the roll shafts 146 extends through one of the bearing blocks 145 and is provided with drive sprocket means 147 thereon.

The actuating means for vertically reciprocating the sub-frame assembly 143 comprises a suitable fluid cylinder 148 fixedly attached with respect to the stationary frame 141 and provided with an integral double-ended piston rod having outwardly extending rod sections 149—149 projecting from either side of the piston 150. Suitable clevises 151 attached to the outer ends of the piston rod sections 149 are in turn pivotally attached to a pair of actuating rods 152. Additional clevises 153 mounted on the opposite ends of the rods 152 are in turn pivotally connected to the free end of a pair of crank arms 154 and 155. The opposite ends of the crank arms are fixedly attached to supporting shafts 156 and 157 respectively, which shafts are pivotally mounted within the stationary frame 141. Integrally disposed with respect to the crank arms 154 and 155 are a pair of offset short lift arms 158 and 159 each provided with a suitable lift roller 160 at the free end thereof.

As will be seen from FIGURE 20, a transverse lift plate 161 is disposed above each of the lift rollers 160 and attached to the sub-frame 143. From the foregoing it will thus be observed that actuation of the fluid cylinder 148 from the position shown in FIGURE 20 will drive the piston 150 to the left, together with the actuating rods 152—152 so as to arcuately displace the crank arms 154–155 counter-clockwise and producing a similar displacement of the short lift-arms 158 and 159, which, because of their engagement beneath the lift plates 161 produces a vertical or elevating displacement of the sub-frame assembly 143 and its attached rubber covered conveyor rolls 144. As shown in FIGURE 19, the crank arm arrangement comprising the long crank arms and short lift arms is preferably duplicated at opposite ends of the transfer station E, it being apparent that actuation of the cylinder 148 will transmit from the crank arms 154–155 a corresponding displacement to a similar set of crank arms fixedly attached to the opposite ends of the pivotally supported shafts 156 and 157.

To provide a more balanced and smoother operation with respect to the raising and lowering of the conveyor rolls 144, a counterweight 162 is shown mounted upon the end of a counterweight shaft 163, which shaft in turn is integrally attached to the collar joining the lift arms and the crank arms. Alternatively, the counterweights 162 may have their shafts 163 attached to a collar disposed at any point along the length of the shafts 156 and 157, the point being that the total mass of the combined counterweights 162 should approximate the weight of the lift frame assembly 143 and its supported conveyor rolls 144 for the purpose of ensuring ease in actuation of the lift means.

As shown in FIGURE 20, the sub-frame assembly 143 is disposed in its lowermost position thereby placing the top of the rubber covered conveyor rolls 144 beneath the level of the top of the conveyor belts 40. When all of the lights have been received upon the moving conveyor belts 140 and the movement of these belts is halted, the fluid cylinder 148 is actuated as above described to elevate the conveyor rolls 144 which then rotate in a direction to move the partially broken lights in a direction towards the top of the station E as viewed in FIGURE 19.

A suitable breaker roll assembly generally designated 164, of similar construction to the breaker rolls 132, 134, and 135 described in connection with the cutting station D, receives the partially broken lights as they are discharged from the transfer station E by the elevated rotating conveyor rolls 144. It will be seen that the breaker roll assembly 164 which is disposed at right angles with respect to the previously described breaker rolls breaks the cuts produced by the short cutting bridge 79 with the result that all of the cuts produced by both of the bridges on the cutting station have now been broken to produce the desired size and number of lights.

Stacker station

As the light emerge from the breaker roll assembly 164 associated with the transfer station E, they are deposited thereby upon a plurality of moving endless conveyor belts 170 supported by the stationary frame 171 of the stacker station F. As in the case of the conveyor belts 140 on the transfer station, the conveyor belts 170 are likewise driven by any suitable means at a surface speed slightly greater than the surface speed of the rolls comprising the breaker assembly 164 in order to advance the broken lights away from the trailing glass section as soon as the break is made, thereby precluding any damaging contact between opposed freshly made breaks of adjacent lights.

Figure 22:
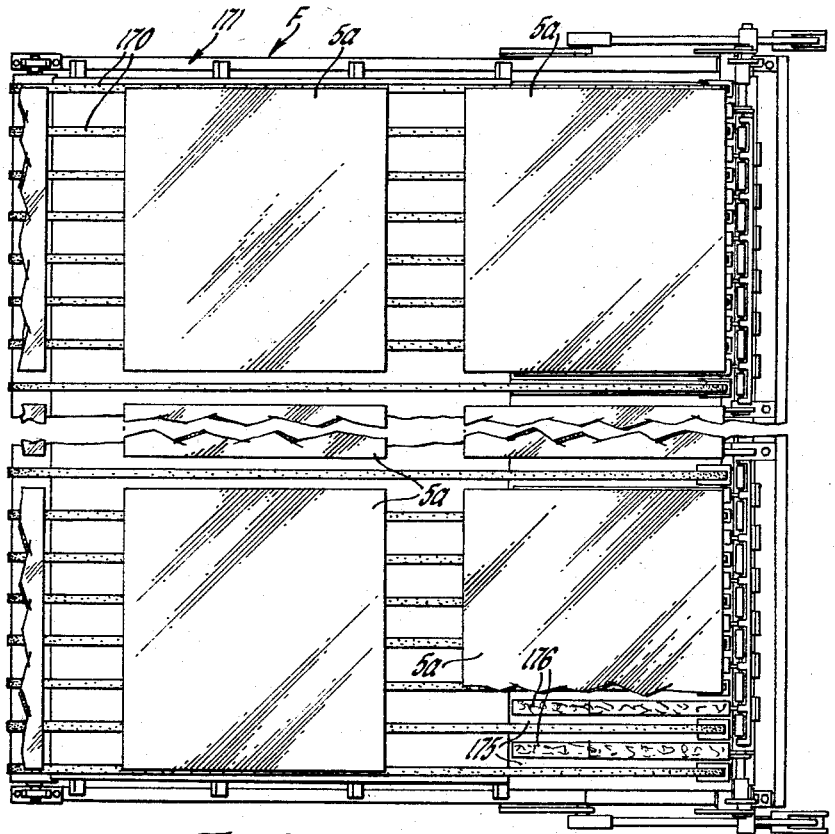
FIGURE 22 is a top plan view, partly broken away, of the stacker station of FIGURE 21.
Figure 21:
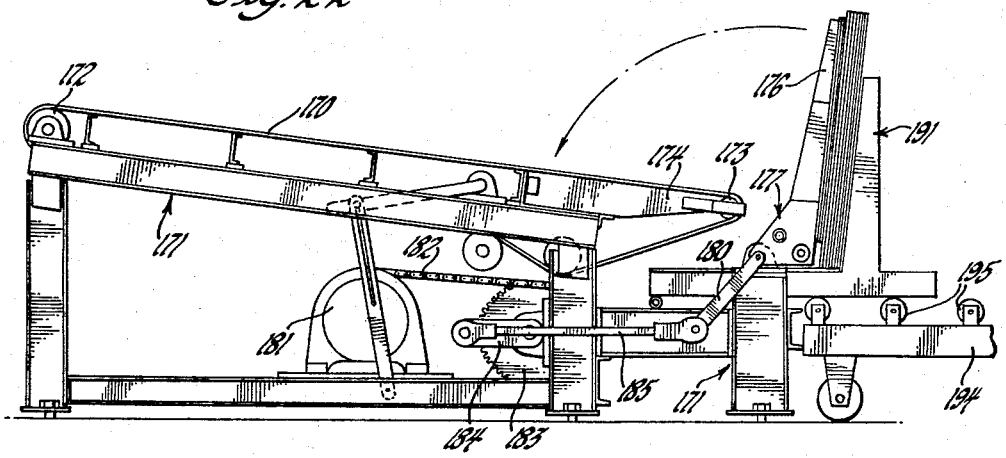
FIGURE 21 is a side elevation view of the stacker station.

As will be most clearly seen in FIGURE 21, the upper flights 170 are sheaved about oppositely disposed rollers 172 and 173. The uppermost rollers 172 may comprise a plurality of separate rollers mounted on a common shaft or a single large continuous longitudinal roller for driving all of the belts 170 simultaneously. The rollers 173, however, at the opposite ends of the station, comprise separate wheels for each of the belts 170, each wheel being in turn supported at the free end of a conveyor belt frame arm 174. The frame arms 174 are laterally spaced with respect to one another to provide recesses 175 therebetween for the reception of stacker arms 176 as most clearly seen in FIGURE 22.

The stacker arms 176 shown in greater detail in FIGURES 23–25 are each provided with a supporting plate 177 at their lower portions, which plates are keyed or fixed by any suitable means to a common transversely disposed pivot shaft 178 journalled within suitable bearings contained in pillow blocks 179 fixedly attached with respect to the stationary frame 171. An actuating arm 180 is integrally attached adjacent the ends of the pivot shaft 178 for the purpose of providing pivotal or swinging movement to the stacker arms 176.

The motive force for controlling the actuating arm 180 is supplied by means of any suitable motor as indicated by 181, said motor driving a sprocket chain 182 sheaved about a sprocket gear 183 journalled in fixed relation to the stationary frame 171. A crank arm 184 integrally connected with respect to the center point of the sprocket gear 183 imparts an oscillating movement to the actuating arm 180 by means of an offset drive link 185 connecting the free end of the crank arm 184 to the free end of the actuating arm 180. It will be apparent from the foregoing that as the motor 181 is operated, the sprocket gear 183 will rotate together with the crank arm 184 thereby producing an oscillation of the actuating arm 180 to periodically pivot the stacker arms 176 from the raised inclined position as shown in FIGURE 21 to the lowered position as illustrated in FIGURE 23, wherein the stacker arms will be disposed between adjacent conveyor belt frame arms 174. The shaft 183a keyed to the gear 183 extends the width of the station in order to transmit equal simultaneous movement to the crank arms 184 and actuating arms 180 mounted at both sides of the stationary frame.

As the spaced apart lights 5a are advanced downwardly by the moving conveyor belts 170, the movement of the belts is terminated when the lowermost edge of the leading lights 5a reaches the lower edge of the belts. A cam pusher assembly generally designated 186 is mounted upon a shaft 187 extending across the width of the station. A plurality of stacker feet 188 having their upper edges 189 projecting above the top cushioned surface 190 of the stacker arms 176 are fixedly mounted with respect to the pivotal shaft 187. As will be most clearly seen in FIGURE 23, the leading edge of the lights 5a abuts the top portion 189 of the stacker feet 188 at the end of the conveyor belts 170. At this point, the variable-speed motor 181 is activated to drive the crank arms 184 and their related drive structure for the purpose of pivoting or swinging the stacker arms 176 to the position shown in FIGURE 24. There is no delay when the lights reach the feet 188 since the variable-speed motor 181 is timed by the operator to complete a full cycle before the subsequent rows of lights reach the end of the belts 170. As the arms 176 are raised from between the adjacent conveyor belt frame arms 174, the lights 5a which were disposed upon the lower ends of the belts 170 will be carried thereby towards the outermost sheet of stacked lights 5a previously deposited upon a stacking pallet generally designated 191. The pallet comprises a base 192 having an upwardly inclined back support 193 and the undersurface of the base is preferably provided with a flat surface adapted to be readily moved upon a suitable transport conveyor 194 provided with a plurality of rollers 195 as shown in FIGURE 21. The base 192 is bifurcated towards its outer forwardmost ends in order to accommodate the soon-to-be described operation of the pivoting stacker arms 176. Suitable drag rollers 196 support the forward ends of the base 192, said rollers being fixedly disposed with respect to the stationary frame 171 for purposes which will become apparent hereinafter.

As the stacking arms approach the position as illustrated in FIGURE 24, the cam 197 fixedly mounted with respect to the shaft 187 and provided with a release notch 198, engages a fixed pusher rod 199 attached to the stationary frame. It will be understood that the cam pusher assembly 186 is normally spring-urged by any suitable means (not shown) to its at rest position, as illustrated in FIGURE 23 and the subsequent engagement of the end of the pusher rod 199 within the release notch 198 will be seen to arcuately displace the cam 197 and its integral shaft 187 against the force of this spring means as the actuating arm 180 is further moved counter-clockwise, as illustrated in FIGURE 24.

Associated with the cam pusher assembly 186 are a plurality of glass pushing rollers 200 rotatably mounted upon a shaft 200a fixed with respect to the cam and its shaft. When the pusher roller assembly is in its normal at rest position as shown in FIGURE 23, the rollers are disposed with their periphery just below the undersurface of the light 5a. It will be seen, however, that as the stacker arms 176 are rotated about their pivot 178 and the cam pusher assembly 186 is further in turn rotated counter-clockwise by means of engagement with the pusher rod 199, the attached glass pushing rollers 200 will be in turn moved outwardly away from the top surface 190 of the stacker arms 176, the limit of this displacement of the rollers being governed by the vertical positioning of the adjustable pusher rods 199. The purpose of the displacement of the cam pusher assembly and its attendant rollers 200 will be clarified by referring to FIGURE 25, which illustrates the stacker arms 176 in their terminal stacking position wherein it will be seen that the rollers 200 have pushed the light 5a formerly supported upon the top surface 190 of the arms.

As the stacker arms reach this terminal position, a locking dog 201 pivotally attached as at 202 to the side of the outer plate 177 is spring-urged into engagement with a locking notch 203 formed in the periphery of the cam 197. At this point, the stacking arms begin their return pivotal movement to the position shown in FIGURES 22 and 23.

By reason of the engagement of the locking dog 201 within the notch 203 of the cam 197 it will be seen that during the return movement of the stacker arms that the ends 189 of the stacker feet will clear the outermost sheet of stacked glass on the stacking pallet 191. Just prior to the completion of the return movement of the stacking arms 176, the free end 204 of the cam locking dog 201 is displaced by an unlocking cam roller 205 fixedly mounted with respect to the stationary frame 171 and positioned as shown in FIGURE 23. This displacement of the locking dog will be seen to pivot the dog about its pivot point 202 thereby removing the opposite end of the dog from within the locking notch 203 of the cam 197, with the result that the spring loaded cam pusher assembly 186 returns to its normal at rest position as shown in this figure.

It will now be understood that by adjusting the vertical height of the pusher rods 199, the resultant displacement of the glass pushing rollers 200 may be altered in order to rearwardly push the stacked glass lights 5a and the pallet 191 various degrees across the rollers 195 of the transport conveyor 194. The positioning of the pusher rod 199 is determined by the thickness of the glass light being produced by the apparatus so that the stacking pallet 199 will be pushed back during each actuation of the stacker arms 176 an amount equal to the thickness of the glass thereby preparing the stacking pallet for reception of the next light by providing sufficient clearance so that when the succeeding lights are positioned upon the base 192 of the pallet there will be no sliding contact between the opposed faces of the two outermost lights, which contact may damage the surfaces thereof.

The previously mentioned drag rollers 196 serve the purpose of acting as a brake in order to retard the advancement of the stacking pallet 191 during actuation of the stacker station, since without such drag means the pallet may have a tendency to continue its travel along the rollers 195 of the transport conveyor.

From the foregoing description of the general and specific structure of the present invention, it will be seen that novel means are provided for the automatic cutting of a plurality of lights from a single sheet of glass without the necessity of any intervention on the part of the workmen during normal operation of the apparatus.

It is to be understood that the invention is not limited to the specific features shown, but that the means of construction herein disclosed comprise the preferred form of several modes of putting the invention into effect, and the invention is therefore plain in any of its forms or modifications within the legitimate and valid scope of the appended claims.

I claim:

1. A glass cutting apparatus comprising, in combination, a plurality of stations disposed in series, supply means adjacent the end of the initial one of said stations for supporting large sheets of glass to be cut in a stacked arrangement with each of said sheets substantially vertically disposed, means normally disposed below the top plane of said initial station for picking up single sheets of glass from said supply means and placing them in a horizontal position upon said initial station for movement to subsequent stations, conveyor means on each of said stations for receiving glass sheets from said supply means and the preceding stations, respectively, and advancing them to the next of said stations, said pickup means on said initial station adapted to deliver sheets of glass to said conveyor means on said initial station by moving said vertically disposed sheets through an arc greater than 90°, cutter means on another of said stations for producing cuts in both a longitudinal and transverse direction upon sheets of glass resting thereon, means subsequent to said station having cutter means for breaking the cuts produced in one direction thereon, one of said stations subsequent to said breaker means including means for changing the direction of travel of the sheets of glass thereon, means disposed before the final one of said stations next in line for breaking the cuts produced in the other direction on the sheets of glass, whereby, the final one of said stations receives at one end of its conveyor means a plurality of glass lights for each large sheet picked up by said initial station, means for removing said lights from the other end of said conveyor means on said final station, and means for receiving in stacked arrangement a plurality of lights from said removing means with each of said stacked lights substantially vertically disposed.

2. A glass cutting apparatus comprising, in combination, a plurality of stations disposed in series, supply means adjacent the end of the initial one of said stations for supporting large sheets of glass to be cut in a stacked arrangement with each of said sheets substantially vertically disposed, means normally disposed below the top plane of said initial station for picking up single sheets of glass from said supply means and placing them in a horizontal position upon said initial station for movement to subsequent stations, conveyor means on each of said stations for receiving glass sheets from each preceding station and advancing them to the next of said stations, said pickup means on said initial station adapted to deliver sheets of glass to said conveyor means on said initial station by moving said vertically disposed sheets through an arc greater than 90°, means on another of said stations subsequent to and longitudinally aligned with said initial station for rejecting defective sheets of glass from the plane of said conveyor means, said rejecting means including a pivotally mounted frame supporting said conveyor means on said reject station, means on a subsequent one of said stations for aligning sheets of glass thereon with respect to at least one side edge thereof, cutter means on another of said stations for producing cuts in both a longitudinal and transverse direction upon sheets of glass resting thereon, means subsequent to said station having said cutter means for breaking the cuts produced in one direction thereon, one of said stations subsequent to said breaker means including means for changing the direction of travel of the sheets of glass thereon, means disposed before the final one of said stations next in line for breaking the cuts produced in the other direction on the sheets of glass, whereby, the final one of said stations receives at one end of its conveyor means a plurality of glass lights for each large sheet picked up by said initial station, means for removing said lights from the other end of said conveyor means on said final station, and means for receiving in stacked arrangement a plurality of lights from said removing means with each of said stacked lights substantially vertically disposed.

3. A glass cutting apparatus, comprising, in combination, a cutting station, means adjacent one side of said station for advancing single sheets of glass thereto, a cutting table on said station including conveyor means for advancing said sheets of glass to a point overlying said table, a cutting bridge having a plurality of depending cutters mounted above the plane of said cutting table adapted to traverse one dimension of said cutting table to produce a plurality of cuts upon said glass sheet, a second cutting bridge having a plurality of depending cutters disposed above the plane of said cutting table mounted upon said station for movement across said cutting table normal to the direction of said first cutting bridge, conveyor means normally disposed below the plane of said cutting table operable subsequent to actuation of both of said cutting bridges to off-load said sheet of glass from said station to a side thereof adjacent the side of said station which previously received the sheet of glass, a transfer station adjacent said cutting station for receiving sheets of glass therefrom, transverse breaker rolls disposed between said transfer and cutting station for breaking said sheet of glass along the cuts produced by said second cutting bridge, conveyor means on said transfer station for receiving the broken lights from said breaker rolls, second conveyor means on said transfer station operable to engage said lights to direct same in a direction normal to the direction imparted by the first of said conveyor means on the transfer station, a second set of breaker rolls for receiving said lights from said second conveyor means on said transfer station for breaking said lights along the cuts produced by said first cutting bridge, and means for receiving and stacking said lights as they are discharged from said second breaker rolls.

4. A glass cutting apparatus comprising, in combination, a cutting station having a fixed cutting table, conveyor means adjacent said station for delivering sheets of glass thereto, glass supply means at one end of said conveyor means, pickup means at one end of said conveyor means for removing single sheets of glass from said supply means and delivering the single sheets to said conveyor means, a plurality of conveyor belts spanning said cutting table and operable to dispose their top surfaces above the plane of the table to direct a sheet of glass from said conveyor means to an overlying relationship with said table, a pair of bridges mounted on said station at right angles to one another above said table and each provided with a plurality of cutters depending therefrom, means for traversing each of said bridges across said table to produce a plurality of cuts on the surface of the sheet of glass therebeneath, a plurality of conveyor wheels mounted beneath said table and operable upon completion of said traversing of said bridges to dispose the top surfaces thereof above the plane of said table to off-load the sheet of glass from said station in a direction normal to the direction from which the sheet of glass was received, first breaker means adjacent said station for breaking the cuts produced on the sheet of glass by one of said bridges, second breaker means disposed normal to said first breaker means for breaking the cuts produced by the other of said bridges, transfer conveyor means mounted from the exit of said first breaker means to the entrance of said second breaker means for directing the partially broken lights therebetween, and means mounted at the exit of said second breaker means for picking up and stacking the fully broken lights.

5. In a glass cutting apparatus including a cutting station having conveyor means, the combination comprising, sheet glass supply means, an unstacker station disposed between said supply means and cutting station for delivering single sheets of glass therebetween, means on said supply means adapted to support a plurality of stacked sheets of glass in a substantially upright position adjacent to said unstacker station, said unstacker station including a stationary frame provided with spaced glass conveyor means coplanar with said cutting station conveyor means and operable to direct sheets of glass in a longitudinal direction from said supply means towards said cutting station, a frame assembly supported by said stationary frame below said unstacker station conveyor means and provided with drive means operable to reciprocate said assembly towards and away from the adjacent upright sheet of glass, glass pickup means pivotally attached to the outer end of said reciprocating frame assembly and normally disposed parallel to said frame assembly and below said unstacker station conveyor means, cam guide means on said unstacker station engaging said pickup means, whereby, when said frame assembly is longitudinally moved towards said supply means, said pickup means is pivoted from a horizontal position below said unstacker station conveying means to a position parallel with the opposed adjacent upright sheet of stacked glass to engage and grip same, and said guide means during the return reciprocation of said frame assembly pivots said pickup means and attached sheet of glass to deposit the sheet of glass upon the top of said spaced conveyor means on said unstacker station as said pickup means returns to its horizontal position below said last mentioned conveyor means.

6. In a glass cutting apparatus including a cutting station, the combination comprising, sheet glass supply means, an unstacker station disposed between said supply means and cutting station for delivering single sheets of glass therebetween, means on said supply means adapted to support a plurality of stacked sheets of glass in a substantially upright position adjacent to said unstacker station, said unstacker station including a stationary frame provided with spaced conveyor means operable to direct sheets of glass towards said cutting station, a frame assembly supported by said stationary frame and provided with drive means operable to reciprocate said assembly towards and away from the adjacent upright sheet of glass, glass pickup means pivotally attached to the outer end of said reciprocating frame assembly, guide means on said unstacker station engaging said pickup means, an oscillating frame assembly within which said reciprocating frame assembly slides, said oscillating frame assembly pivotally mounted upon crank means medially connected to said stationary frame, means operable to actuate said crank means to oscillate said oscillating frame assembly, whereby, when said pickup means engages and grips a stacked sheet of glass said actuating means is operated to oscillate both of said frame assemblies and said pickup means in a direction upwardly and away from said supply means as said drive means is actuated to retract said reciprocating frame assembly.

7. A glass cutting apparatus according ot claim 6, wherein, said pickup means includes a plurality of longitudinal arms each provided with a plurality of vacuum cups, whereby, when said pickup means is oscillated and fully retracted away from said supply means with a sheet of glass gripped by said cups said glass will be disposed in a plane above said spaced conveyor means, and when said crank acutating means is reversed said frame assemblies and pickup arms are oscillated downwardly to deposit the glass sheet upon said conveyor means as said arms pass downwardly therebetween.

8. A glass cutting apparatus according to claim 6, wherein, said pickup means includes switch regulating means projecting outwardly therefrom and engagable with the adjacent stacked sheet of glass to reverse said drive means when said pickup means has engaged and gripped the adjacent stacked sheet of glass.

9. A glass cutting apparatus according to claim 8, wherein, said supply means includes a motorized rotatable base having a plurality of stacks of glass, and when the last sheet of glass has been removed from any one stack, said switch means by its failure to abut any sheet of glass causes rotation of said motorized base to present another of said stacks in opposed relationship to said pickup means.

10. A glass cutting apparatus according to claim 6, wherein, said pickup means includes an air line extending outwardly therefrom and having its outlet projecting upwardly below the bottom of the stacked sheets of glass, whereby, when said pick-up means engages and gripes the sheet of stacked glass pressurized air is ejected from said line behind the outermost glass sheet to assist in breaking the natural suction therebehind as said actuating means is operated.

11. A glass cutting apparatus comprising in combination, a cutting station, having a pair of fixed side channels and a pair of fixed end channels supported above said side channels, a cutting table disposed within the perimeter defined by said channels, means for conveying sheets of glass between two of said channels to said table, conveyor means on said table having means to elevate the top surface thereof from a normal lower position to a height above said table to deliver sheets of glass into overlaying relationship with said table whereby, when said conveyor means on said table is returned to its normal lower position, the sheet of glass is supported by said table, a first cutting bridge supported above and between said side channels and including a plurality of cutters depending therefrom, means carried by said side channels connected with said bridge to drive said bridge across said table to produce a plurality of cuts upon the sheet of glass thereon, a second cutting bridge supported below and between said end channels and including a plurality of cutters depending therefrom, means carried by said end channels connected with said second bridge to drive said bridge across said table to produce a plurality of cuts upon the sheet of glass thereon in a direction normal to the cuts produced by said cutters on said first bridge, second conveyor means on said table having means to elevate the top surface thereof from a normal lower position to a height above said table to off-load the cut sheet of glass from said table.

12. A glass cutting apparatus according to claim 11, wherein, said table is provided with a pair of reciprocating fingers projecting upwardly adjacent one side thereof, and means for actuating said fingers to align the sheet of glass after said first conveying means on said table has returned to its normal lower position.

13. A glass cutting apparatus according to claim 11, wherein, said cutters on each of said bridges are supported upon a cutter bar journalled for pivotal movement at the ends of said bridges and cam follower means secured at one end of said bars, and cam means on said channels adjacent said follower means, whereby, when said bridges are driven across said table said cutters are raised and lowered upon a sheet of glass thereon by engagement of said follower means with said cam means.

14. A glass cutting apparatus according to claim 13, including, spring means normally biasing said cutters downwardly and said follower means towards said cam means, and said cam means are positioned whereby said cutters are lowered when disposed over the sheet of glass and raised when clear of the edges of said sheet of glass.

15. A glass cutting apparatus according to claim 11, including, breaker means mounted adjacent opposite sides of said table and normally disposed below the plane of a sheet of glass on said table, said breaker means comprising bars mounted for movement above the sheet of glass and adapted to engage the adjacent edges of the glass sheet upon downward movement thereof to break off marginal portions of the sheet of glass.

16. In a glass cutting apparatus including a cutting station and an unstacker station for delivering large sheets of glass thereto, the combination comprising, a transfer station disposed in series following said cutting station for receiving sheets of glass from said cutting station, a stationary frame on said transfer station including conveyor means thereon for directing said sheets of glass onto said transfer station, second conveyor means in said transfer station travelling in a direction normal to the direction of said first conveyor means and normally positioned with its conveying surface below the plane of said first conveyor means when said sheets of glass are being recieved by said transfer station, means supporting said second conveyor means for verticle movement to elevate the top surface thereof above said first conveying means to off-load said sheets of glass from said transfer station.

17. A glass cutting apparatus according to claim 16, wherein, said supporting means comprises a sub-frame assembly slidably disposed within said stationary frame, and fluid cylinder means connected to said sub-frame assembly for raising and lowering said second conveyor means.

18. A glass cutting apparatus according to claim 16, wherein, said first conveyor means comprises a plurality of conveyor belts, and said second conveyor means includes a plurality of conveyor rolls disposed between said conveyor belts.

19. A glass cutting apparatus according to claim 17, including, actuating means connected to said fluid cylinder for transmitting reciprocating motion therefrom to said sub-frame assembly.

20. A glass cutting apparatus according to claim 19, wherein said actuating means comprises a pair of crank arms pivotally attached to said cylinder on the one hand and having their other ends each pivotally supported upon opposite sides of said stationary frame, and a lift arm projecting from each of said crank arms and having their free ends disposed in engagement with said sub-frame assembly, whereby, operation of said cylinder arcuately displaces said crank and lift arms to vertically displace said sub-frame assembly.

21. In a glass cutting apparatus including a cutting station and an unstacker station for delivering large sheets of glass thereto, the combination comprising, a stacker station disposed for receiving cut sheets of glass from said cutting station, said stacker station including a stationary frame provided with conveyor means thereon, a plurality of spaced apart frame arms projecting from one end of said stationary frame, said conveyor means on said stationary frame extending over said arms, a plurality of stacker arms pivotally mounted adjacent the free ends of said frame arms for swinging movement from an upright stacking position to a loading position disposed between said frame arms whereupon the top surfaces thereof will be substantially co-planar with the top surface of said conveyor means, motor-driven crank means connected to said stacker arms for swinging said stacker arms from said stacking to said loading positions and return, movable pallet means adjacent said stacker arms for receiving therefrom cut sheets of glass picked up from said conveyor means by said stacker arms, said stacker arms including a foot element pivotally mounted thereon and normally disposed above the top surface thereof, for supporting sheets of glass picked up by said stacker arms, pusher means pivotally mounted upon said stacker arms adjacent said foot element, and cam means on said stacker arms controlling the pivotal displacement of said foot element and pusher means and operable when said stacker arms are in the upright stacking position to displace said pusher means outwardly against the sheet of glass as said foot element is displaced inwardly from its glass supporting position to deposit the glass upon said pallet means.

22. A glass cutting apparatus according to claim 21, wherein, said cam means includes means locking said pusher means and foot elements in their displaced positions when said stacker arms are in the upright stacking position, and unlocking means engaging said locking means as said stacker arms are returned by said crank means to the loading position between said frame arms to permit said cam means to return to its normal position with said foot element projecting outwardly and said pusher means retracted.

References Cited by the Examiner
UNITED STATES PATENTS

| | | | |
|---|---|---|---|
| 1,556,438 | 10/1925 | Hanson et al. | 193—36 X |
| 1,946,356 | 2/1934 | Owen | 225—96.5 |
| 2,049,850 | 8/1936 | Lytle et al. | 214—8.5 |
| 2,340,807 | 2/1944 | Grein et al. | 214—7 |
| 2,693,053 | 11/1954 | Eakin | 225—96.5 |
| 2,763,360 | 9/1956 | Gibson et al. | 214—7 X |
| 2,948,991 | 8/1960 | Walters et al. | 225—96.5 |
| 3,104,006 | 9/1963 | Jones | 209—74 |
| 3,126,108 | 3/1964 | Langhart | 214—8.5 |
| 3,140,629 | 7/1964 | Ingold | 225—96.5 |
| 3,151,794 | 10/1964 | Brand | 225—96.5 |
| 3,169,630 | 2/1965 | Christiansen | 193—36 X |
| 3,190,518 | 6/1965 | Insolio | 225—96.5 |

WILLIAM W. DYER, Jr., *Primary Examiner.*

JAMES M. MEISTER, *Assistant Examiner.*